(12) United States Patent
Fukuoka et al.

(10) Patent No.: US 11,548,981 B2
(45) Date of Patent: Jan. 10, 2023

(54) POLYPHENYLENE ETHER, COMPOSITION OF THE SAME, AND MANUFACTURING METHOD OF THE SAME

(71) Applicant: ASAHI KASEI KABUSHIKI KAISHA, Tokyo (JP)

(72) Inventors: Hiroshi Fukuoka, Tokyo (JP); Shoji Otani, Tokyo (JP); Katsuhiro Iwase, Tokyo (JP); Masaaki Aramaki, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 17/042,513

(22) PCT Filed: Mar. 29, 2019

(86) PCT No.: PCT/JP2019/014189
§ 371 (c)(1),
(2) Date: Sep. 28, 2020

(87) PCT Pub. No.: WO2019/189829
PCT Pub. Date: Oct. 3, 2019

(65) Prior Publication Data
US 2021/0024695 A1   Jan. 28, 2021

(30) Foreign Application Priority Data

Mar. 29, 2018 (JP) .............................. JP2018-065328
Mar. 29, 2018 (JP) .............................. JP2018-065441

(51) Int. Cl.
*C08G 65/48* (2006.01)
*C08J 5/24* (2006.01)

(52) U.S. Cl.
CPC ................. *C08G 65/485* (2013.01)

(58) Field of Classification Search
None
See application file for complete search history.

(56) References Cited

U.S. PATENT DOCUMENTS 5,880,221 A    3/1999  Liska et al.
9,012,572 B2   4/2015  Lin et al.
(Continued)

FOREIGN PATENT DOCUMENTS

CN    1404494 A      3/2003
JP    2000-509097    7/2000
(Continued)

OTHER PUBLICATIONS

ISR issued in WIPO Patent Application No. PCT/JP2019/014189, dated Jun. 25, 2019, English translation.
(Continued)

*Primary Examiner* — Randy P Gulakowski
*Assistant Examiner* — Ha S Nguyen
(74) *Attorney, Agent, or Firm* — Greenblum & Bernstein P.L.C.

(57) ABSTRACT

A polyphenylene ether having a predetermined structure.

(1a)

(1b)

(Continued)

-continued

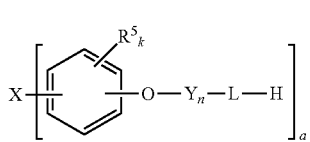
(1c)

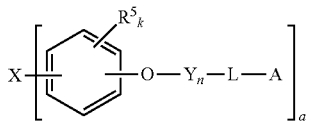

(1d)

9 Claims, 1 Drawing Sheet

(56) References Cited

U.S. PATENT DOCUMENTS

| | | | |
|---|---|---|---|
| 2003/0045757 A1 | 3/2003 | Ishii et al. | |
| 2004/0146692 A1* | 7/2004 | Inoue | B32B 15/14 |
| | | | 428/141 |
| 2005/0154178 A1 | 7/2005 | Bender | |
| 2006/0041086 A1 | 2/2006 | Birsak et al. | |
| 2007/0213499 A1 | 9/2007 | Uera et al. | |
| 2009/0018303 A1 | 1/2009 | Onizuka et al. | |
| 2014/0323666 A1* | 10/2014 | Lin | C08G 65/44 |
| | | | 525/392 |
| 2016/0102174 A1* | 4/2016 | Avakian | C08G 65/44 |
| | | | 525/390 |
| 2018/0312683 A1 | 11/2018 | Umehara et al. | |

FOREIGN PATENT DOCUMENTS

| | | |
|---|---|---|
| JP | 2004-339328 | 12/2004 |
| JP | 2011-099044 | 5/2011 |
| JP | 5147397 | 2/2013 |
| JP | 5176336 | 4/2013 |
| JP | 5439700 | 3/2014 |
| JP | 2017-128718 | 7/2017 |
| WO | 2004/067634 | 8/2004 |
| WO | 2007/097231 | 8/2007 |

OTHER PUBLICATIONS

IPRP issued in WIPO Patent Application No. PCT/JP2019/014189, dated Sep. 29, 2020, English translation.

Supplemental European Search Report issued in EP Patent Applicant No. 19778067.9, dated Apr. 12, 2021.

* cited by examiner

POLYPHENYLENE ETHER, COMPOSITION OF THE SAME, AND MANUFACTURING METHOD OF THE SAME

TECHNICAL FIELD

The present invention relates to a new polyphenylene ether, a composition of the same, and a manufacturing method of the same.

BACKGROUND ART

Materials having low dielectric characteristics for processing a large amount of data at a high speed in a highly advanced information society are required as materials for electrical and electronic uses. Among others, polyphenylene ethers are known for having excellent dielectric characteristics such as a dielectric constant, dielectric loss tangent, and the like and for having excellent dielectric characteristics even in a high-frequency band (high-frequency region) from a MHz band to a GHz band. Therefore, polyphenylene ether-based resin is used as a substrate material and the like for configuring base materials of printed wiring boards included in electronic devices utilizing high-frequency bands as a high-frequency molding material.

Meanwhile, excellent heat resistance, excellent moldability, and the like are also required in addition to excellent dielectric characteristics when using as a molding material such as a substrate material. In this regard, conventional polyphenylene ethers are thermoplastic and cannot provide sufficient heat resistance in some cases. Therefore, use of a material in which thermosetting resin such as epoxy resin is added to a polyphenylene ether, use of a material which is obtained by modifying a polyphenylene ether, and the like have been supposed (Patent Literature 1).

Patent Literature 1 describes a modified polyphenylene ether compound having a predetermined polyphenylene ether moiety in its molecular structure, with a molecular terminal thereof having at least one or more of a p-ethenylbenzyl group, a m-ethenylbenzyl group, and the like.

Examples of a resin composition containing a polyphenylene ether having been modified include the polyphenylene ether resin composition described in Patent Literature 2.

Patent Literature 2 describes a polyphenylene ether resin composition including a polyphenylene ether having a polyphenylene ether moiety in its molecular structure, having a p-ethenylbenzyl group, a m-ethenylbenzyl group, or the like at a molecular terminal thereof, and having a number-average molecular weight of 1000 to 7000, and a crosslinking-type curing agent.

Patent Literature 3 describes a modified polymer having a polyphenylene ether moiety in its molecular structure and having a methacryl group at a molecular terminal thereof.

Another problem of polyphenylene ethers is that since polyphenylene ethers generally have relatively high molecular weights, and softening points thereof are high, polyphenylene ethers tend to have high viscosity and low flowability. When a printed wiring board is manufactured by forming a prepreg, which is used for manufacturing a multilayer printed wiring board and the like, by using such a polyphenylene ether and using the formed prepreg, the problem in moldability may occur that molding failure such as voids generated at the time of multilayer molding occurs during manufacturing, for example, and a highly-reliable printed wiring board is difficult to obtain.

In order to suppress occurrence of such problems, use of a polyphenylene ether having a relatively low molecular weight is considered. However, when such a polyphenylene ether with a merely reduced molecular weight is used, curing of a resin composition including such a polyphenylene ether is insufficient even thermosetting resin or the like is used in combination, and thermal resistance of a resultant cured product tends not to be sufficiently enhanced. In addition, as a distance between crosslinked points after curing becomes short, the polymer generally tends to be fragile, and a rubber component is required to be added so as to improve fragility.

As a method for solving these problems, low-molecular weight branched polyphenylene ethers which are obtained through polymerization in the presence of a polyfunctional phenol compound having a valence of three or more have been proposed (Patent Literatures 4, 5, and 6). Since these branched polyphenylene ethers have branched structures, they have solution viscosity lower than that of linear polymers at the same molecular weight, and they have high flowability relative to a linear polymer having the same molecular weight. Therefore, a polymer having a higher molecular weight can be used at the time of curing, and improvement in physical properties of a cured product can be expected. In addition, since the number of crosslinking reaction points increases, it is also expected that crosslinking reaction is easily controlled in addition to contribution to the improvement in physical properties described above.

CITATION LIST

Patent Literature

Patent Literature 1: Japanese Patent Laid-Open No. 2004-339328
Patent Literature 2: International Publication No. WO 2004/067634
Patent Literature 3: Japanese Patent No. 5147397
Patent Literature 4: U.S. patent Ser. No. 09/012,572
Patent Literature 5: Japanese Patent No. 5176336
Patent Literature 6: Japanese Patent No. 5439700

SUMMARY OF INVENTION

Technical Problem

However, these branched polyphenylene ethers can be further improved from the viewpoint of further reducing solution viscosity. In addition, when polyfunctional phenols are used for polymerization reaction, polymers may be crosslinked to each other during polymerization to cause side-reaction such as gelation in general. Polymerization needs to be carried out while keeping a monomer concentration low in order to prevent such reaction (Patent Literatures 4 and 5).

As one method for solving this problem, a method in which the molecular weight of a high molecular weight polyphenylene ether is reduced by redistribution reaction in the presence of a polyfunctional phenol compound and a radical initiator to obtain a branched polyphenylene ether (redistribution method) is considered instead of a method of polymerizing monomers in the presence of a polyfunctional phenol compound (polymerization method).

However, the method using redistribution reaction requires a high molecular weight polyphenylene ether to be dissolved in a non-polar solvent such as toluene in advance, but most of polyfunctional phenol compounds are poorly soluble in non-polar solvents including toluene in general.

Practically, as in the polymerization methods disclosed in Patent Literatures 5 and 6, polyfunctional phenol compounds are dissolved in a polar solvent such as methanol, and polymerization is carried out at a very low concentration. Redistribution reaction cannot be carried out using such a poorly-soluble polyfunctional phenol compound.

When a polyfunctional phenol compound is dissolved in a polar solvent such as methanol and dropped into a polyphenylene ether solution as employed in the polymerization method of Patent Literature 5, the dissolved polyphenylene ether precipitates. Accordingly, it is extremely difficult to obtain a branched polyphenylene ether from a system using an existing polyfunctional phenol compound through redistribution reaction in practice, and a highly-branched polyphenylene ether without causing gelation or the like has not been obtained.

The present invention has been made in view of the above problems and aims at providing a polyphenylene ether, which is capable of providing a solution having high flowability when the polyphenylene ether is mixed with a liquid, and a composition thereof. In addition, the present invention aims at providing a polyphenylene ether manufacturing method capable of manufacturing a polyfunctional ether, which is capable of providing a solution having high flowability when the polyphenylene ether is mixed with a liquid, with high productivity without accompanying side-reaction such as gelation.

More specifically, the present invention is as follows.

[1]

A polyphenylene ether having a structure represented by formula (1a), formula (1b), formula (1c), or formula (1d) below:

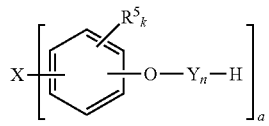
(1a)

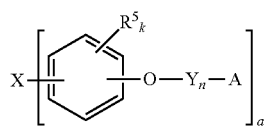
(1b)

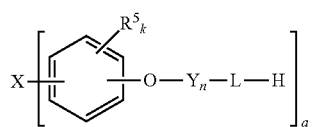
(1c)

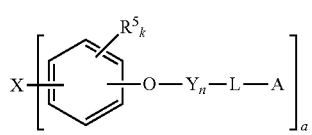
(1d)

wherein

X is an arbitrary a-valent linking group; a is an integer of 3 to 6; each $R^5$ is independently an arbitrary substituent, each k is independently an integer of 1 to 4; at least one of a number k of $R^5$ includes a group represented by formula (2) below; each Y is independently a divalent linking group represented by formula (3) below; each n represents number of repetitions of Y and is an integer of 1 to 200; each L is independently an arbitrary divalent linking group; and each A independently represents a substituent containing a carbon-carbon double bond and/or an epoxy bond:

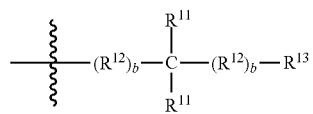
(2)

wherein each $R^{11}$ is independently a C1-8 alkyl group; each $R^{12}$ is independently a C1-8 alkylene group; each b is independently 0 or 1; $R^{13}$ represents any one of a hydrogen atom, a C1-8 alkyl group, and a phenyl group; and the alkyl group, the alkylene group, and the phenyl group may have a substituent within a limit satisfying the requirement of C1-8,

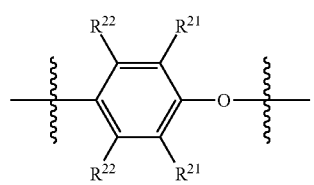
(3)

wherein each $R^{21}$ is independently a saturated or unsaturated C1-6 hydrocarbon group, and each $R^{22}$ is independently a hydrogen atom or a saturated or unsaturated C1-6 hydrocarbon group, and the saturated or unsaturated hydrocarbon group may have a substituent within a limit satisfying the requirement of C1-6.

[2]

The polyphenylene ether according to [1], wherein the group represented by formula (2) is directly bonded to the benzene ring to which $R^5$ is bonded.

[3]

The polyphenylene ether according to [1] or [2], wherein each of $R^{11}$ and $R^{13}$ in the group represented by formula (2) is a methyl group.

[4]

The polyphenylene ether according to any one of [1] to [3], wherein the group represented by formula (2) is a t-Bu group.

[5]

The polyphenylene ether according to any of [1] to [4], wherein the group represented by formula (2) is bonded to 2-position and/or 6-position of the benzene ring to which $R^5$ is bonded.

[6]

The polyphenylene ether according to any one of [1] to [5], wherein $R^{21}$ in the group represented by formula (3) is a methyl group.

[7]

The polyphenylene ether according to any one of [1] to [6], wherein a number-average molecular weight is 500 to 30000 in terms of polystyrene.

[8]
A polyphenylene ether composition comprising 0.5% to 95% by mass of the polyphenylene ether according to any one of [1] to [7].

[9]
The polyphenylene ether composition according to [8], for use in a prepreg.

[10]
A manufacturing method of a polyphenylene ether, comprising
a step of reacting an arbitrary polyphenylene ether with an a-valent phenol having a group represented by formula (2) below, provided that a=3 to 6; and
a step of introducing a substituent containing a carbon-carbon double bond and/or an epoxy bond into a terminal of the polyphenylene ether obtained:

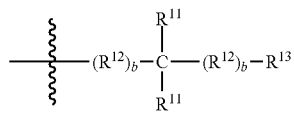

(2)

wherein
each $R^{11}$ is independently a C1-8 alkyl group; each $R^{12}$ is independently a C1-8 alkylene group; each b is independently 0 or 1; $R^{13}$ represents any one of a hydrogen atom, a C1-8 alkyl group, and a phenyl group; and the alkyl group, the alkylene group, and the phenyl group may have a substituent within a limit satisfying the requirement of C1-8.

Advantageous Effects of Invention

According to the present invention, a polyphenylene ether, which is capable of providing a solution having high flowability when the polyphenylene ether is mixed with a liquid, a manufacturing method thereof, and a composition thereof can be provided. Consequently, a polyphenylene ether having dielectric characteristics and heat resistance by nature can be more effectively used for various uses such as uses as materials for various electrical and electronic devices.

DESCRIPTION OF EMBODIMENT

Figure 1:
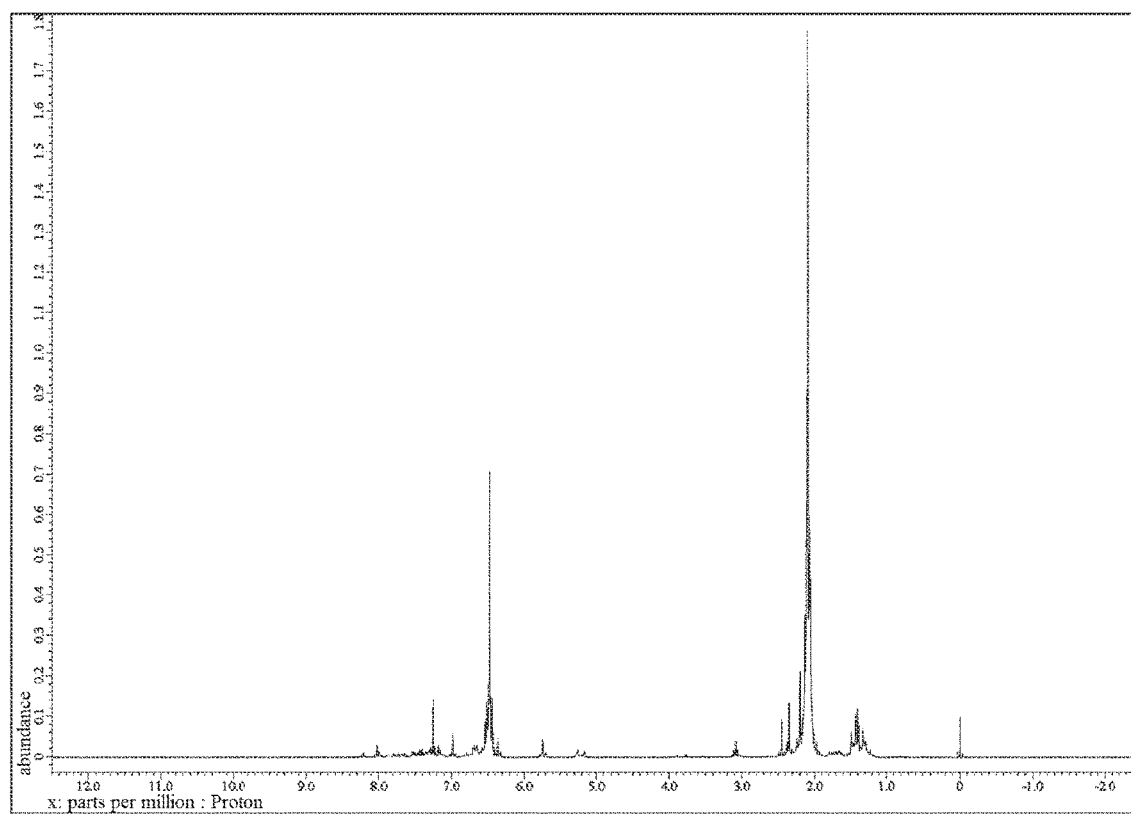
FIG. 1 shows a 1H-NMR measurement result of polyphenylene ether 7 obtained in Example 7.

Hereinafter, an embodiment for carrying out the present invention (hereinafter, simply referred to as "the present embodiment") will be described in detail. However, the present invention is not limited to the following embodiment, and the present invention can be carried out in a variety of modifications within the spirit thereof.

[Polyphenylene Ether]

A polyphenylene ether of the present embodiment has a structure represented by the following formula (1a), formula (1b), formula (1c), or formula (1d).

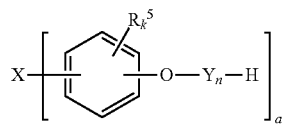

(1a)

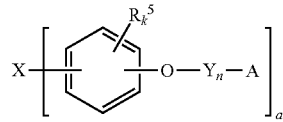

(1b)

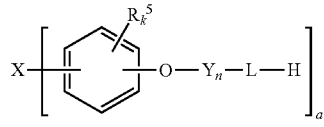

(1c)

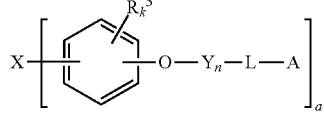

(1d)

In formula (1a), formula (1b), formula (1c), or formula (1d), X is an arbitrary a-valent linking group, and a is an integer of 3 to 6.

While the arbitrary a-valent linking group represented by X is not particularly limited, examples thereof include a hydrocarbon group; a hydrocarbon group containing one or more elements selected from nitrogen, phosphorus, silicon, and oxygen; and an element such as nitrogen, phosphorus, or silicon or a group including such an element.

Specific examples of such X include an a-valent alkyl skeleton bonded to the benzene ring, to which $R^5$ is bonded, via a single bond or an ester bond or the like; an a-valent aryl skeleton bonded to the benzene ring, to which $R^5$ is bonded, via a single bond or an ester bond or the like; and an a-valent heterocyclic skeleton bonded to the benzene ring, to which $R^5$ is bonded, via a single bond or an ester bond or the like. While the alkyl skeleton herein is not particularly limited, examples thereof include an alkyl skeleton in which pentaerythritol is bonded to the benzene ring, to which $R^5$ is bonded, via an ester bond. In addition, while the aryl skeleton is not particularly limited, examples thereof include an aryl skeleton in which a benzene ring, mesitylene group, or 2-hydroxy-5-methyl-1,3-phenylene group is bonded to the benzene ring, to which $R^5$ is bonded, via a single bond or an alkyl chain. Further, while the heterocyclic skeleton is not particularly limited, examples thereof include a heterocyclic skeleton in which a triazine ring is bonded to the benzene ring, to which $R^5$ is bonded, via a single bond or an alkyl chain.

Examples of a more specific structure of X can include the specific examples of Z described later.

Each $R^5$ is independently an arbitrary substituent, each k is independently an integer of 1 to 4, and when k is two or more, two $R^5$ may be linked to each other to form a ring. At least one of a number k of $R^5$ includes a group represented by the following formula (2).

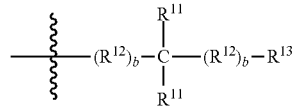

(2)

wherein each $R^{11}$ is independently a C1-8 alkyl group,
each $R^{12}$ is independently a C1-8 alkylene group, b is independently 0 or 1, $R^{13}$ represents any one of a hydrogen atom, a C1-8 alkyl group, and a phenyl group, and the alkyl group, the alkylene group, and the phenyl group may have a substituent within a limit satisfying the requirement of C1-8.

Formula (2) is preferably a group including a secondary carbon and/or a tertiary carbon, and examples thereof include an isopropyl group, an isobutyl group, a sec-butyl group, a tert-butyl group, a tert-amyl group, a 2,2-dimethyl propyl group, and a structure having a phenyl group at a terminal of these groups.

It is preferable that the group represented by formula (2) is directly bonded to the benzene ring to which $R^5$ is bonded in formula (1a), formula (1b), formula (1c), or formula (1d).

The group represented by formula (2) is preferably bonded to the 2-position and/or the 6-position (ortho-positions relative to —O—) of the benzene ring to which $R^5$ is bonded in formula (1a), formula (1b), formula (1c), or formula (1d).

While the group represented by $R^5$ other than the group represented by formula (2) is not particularly limited, examples thereof include a hydrocarbon group having a linear or cyclic structure having 1 to 8 carbon atoms. Examples of the hydrocarbon group having a linear or cyclic structure having 1 to 8 carbon atoms include a methyl group, an ethyl group, a n-propyl group, a n-butyl group, a n-pentyl group, a cyclopentyl group, a n-hexyl group, a cyclohexyl group, a n-heptyl group, a n-octyl group, a phenyl group, a benzyl group, and a 2-ethylhexyl group. Among them, a hydrogen atom, a methyl group, an ethyl group, a n-propyl group, a n-butyl group, a n-pentyl group, a cyclopentyl group, a n-hexyl group, a cyclohexyl group, a n-heptyl group, and a n-octyl group are preferable, and a methyl group is more preferable.

A moiety of the structure of formula (1a), formula (1b), formula (1c), or formula (1d) excluding the structure represented by —$Y_n$—H, —$Y_n$-A, —$Y_n$-L-H, or —$Y_n$-L-A can be represented by the following formula (1').

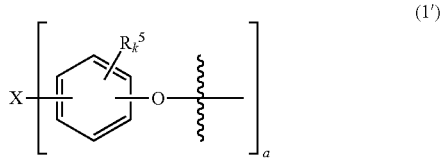

A group having any one of the following structures is preferable as the group represented by formula (1').

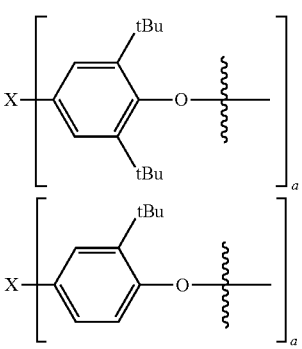

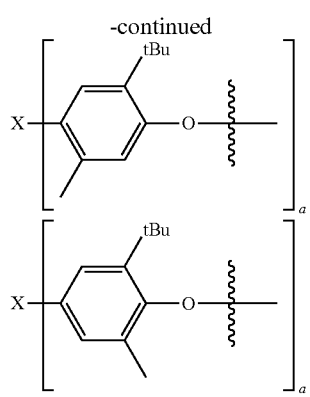

Specific examples of the group represented by formula (1') are not particularly limited but include groups obtained by removing all hydrogen atoms in terminal phenolic hydroxy groups from the following compounds:

4,6-di-tert-butylbenzen-1,2,3-triol, 2,6-bis(3-tert-butyl-2-hydroxy-5-methylbenzyl)-4-methylphenol, 1,1,3-tris(2-methyl-4-hydroxy-5-tert-butylphenyl)butane, 2,4,6-tris(3', 5'-di-tert-butyl-4'-hydroxybenzyl)mesitylene, pentaerythritoltetrakis[3-(3,5-di-tert-butyl-4-hydroxyphenyl)propionate], 1,3,5-tris[[3,5-bis(1,1-dimethylethyl)-4-hydroxyphenyl]methyl-1,3,5-triazine-2,4,6(1H,3H,5H)-trione, and 1,3,5-tris[[4-(1,1-dimethylethyl)-3-hydroxy-2,6-dimethylphenyl]methyl]-1,3,5-triazine-2,4,6(1H,3H,5H)-trione.

Each Y in formula (1a), formula (1b), formula (1c), or formula (1d) is independently a divalent linking group represented by formula (3) (a phenol unit having a substituent), n represents the number of repetitions of Y, and each n is independently an integer of 1 to 200.

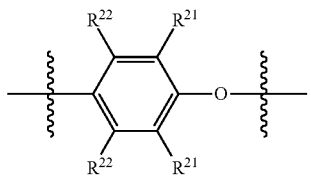

Each $R^{21}$ is independently a saturated or unsaturated C1-6 hydrocarbon group, preferably a methyl group, an ethyl group, an n-propyl group, a vinyl group, an allyl group, an ethynyl group, a propargyl group, or the like, more preferably a methyl group or an ethyl group, and still more preferably a methyl group.

Each $R^{22}$ is independently a hydrogen atom or a saturated or unsaturated C1-6 hydrocarbon group, preferably a hydrogen atom, a methyl group, an ethyl group, an n-propyl group, or the like, more preferably a hydrogen atom or a methyl group, and still more preferably a hydrogen atom.

The saturated or unsaturated hydrocarbon group may have a substituent within a limit satisfying the requirement of C1-6.

A in formula (1b) or formula (1d) is a substituent containing a carbon-carbon double bond and/or an epoxy bond. Examples of the substituent represented by A are not particularly limited but include groups represented by the following formulae (4) to (8).

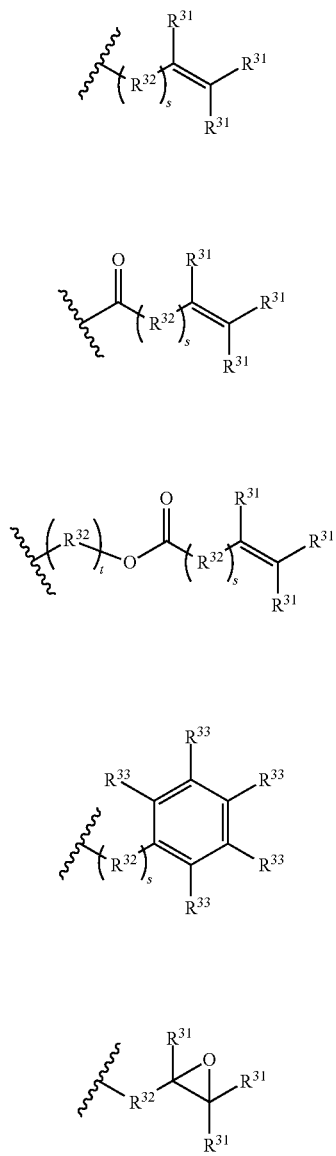

(4)
(5)
(6)
(7)
(8)

In the above formulae, each $R^{31}$ is independently a hydrogen atom, a hydroxy group, or a C1-30 hydrocarbon group, an aryl group, an alkoxy group, an aryloxy group, an amino group, or a hydroxyalkyl group. Each $R^{32}$ is independently a C1-30 hydrocarbon group. Each $R^{33}$ is independently a hydrogen atom, a hydroxy group, or a C1-30 hydrocarbon group, an aryl group, an alkoxy group, an aryloxy group, an amino group, a hydroxyalkyl group, a vinyl group, or an isopropenyl group, and at least one of $R^{33}$ is a vinyl group or an isopropenyl group. Each of s and t is an integer of 0 to 5.

Specific examples of the hydrocarbon group of $R^{31}$ include methyl, ethyl, n-propyl, 2-propyl, n-butyl, isobutyl, t-butyl, n-pentyl, 1-ethylpropyl, 1-methylbutyl, 2-methylbutyl, 3-methylbutyl, amyl, cyclopentyl, 2,2-dimethylpropyl, 1,1-dimethylpropyl, n-hexyl, cyclohexyl, 1-ethylbutyl, 2-ethylbutyl, 3-ethylbutyl, 1-methylpentyl, 2-methylpentyl, 3-methylpentylene, 4-methylpentylene, 1,1-dimethylbutylene, 2,2-dimethylbutylene, 3,3-dimethylbutyl, 1,2-dimethylbutyl, 1,3-dimethylbutyl, 2,3-dimethylbutyl, n-heptyl, 1-methylhexyl, 2-methylhexyl, 3-methylhexyl, 4-methylhexyl, 5-methylhexyl, 1-ethylpentyl, 2-ethylpentyl, 3-ethylpentyl, 1,1-dimethylpentyl, 2,2-dimethylpentyl, 3,3-dimethylpentyl, 4,4-dimethylpentyl, 1,2-dimethylpentyl, 1,3-dimethylpentyl, 1,4-dimethylpentyl, 2,3-dimethylpentyl, 2,4-dimethylpentyl, 3,4-dimethylpentyl, 2-methyl-3,3-dimethylbutyl, 1-methyl-3,3-dimethylbutyl, 1,2,3-trimethylbutyl, 1,3-dimethyl-2-pentyl, 2-isopropylbutyl, 2-methylcyclohexyl, 3-methylcyclohexyl, 4-methylcyclohexyl, 1-cyclohexylmethyl, 2-ethylcyclopentyl, 3-ethylcyclopentyl, 2,3-dimethylcyclopentyl, 2,4-dimethylcyclopentyl, 2-methylcyclopentylmethyl, 2-cyclopentylethyl, 1-cyclopentylethyl, n-octyl, 2-octyl, 3-octyl, 4-octyl, 2-methylheptyl, 3-methylheptyl, 4-methylheptyl, 5-methylheptyl, 6-methylheptyl, 2-ethylhexyl, 3-ethylhexyl, 4-ethylhexyl, 5-ethylhexyl, 1,1-dimethylhexyl, 2,2-dimethylhexyl, 3,3-dimethylhexyl, 4,4-dimethylhexyl, 5,5-dimethylhexyl, 1,2-dimethylhexyl, 1,3-dimethylhexyl, 1,4-dimethylhexyl, 1,5-dimethylhexyl, 2,3-dimethylhexyl, 2,4-dimethylhexyl, 2,5-dimethylhexyl, 1,1-ethylmethylpentyl, 2,2-ethylmethylpentyl, 3,3-ethylmethylpentyl, 4,4-ethylmethylpentyl, 1-ethyl-2-methylpentyl, 1-ethyl-3-methylpentyl, 1-ethyl-4-methylpentyl, 2-ethyl-1-methylpentyl, 3-ethyl-1-methylpentyl, 4-ethyl-1-methylpentyl, 2-ethyl-3-methylpentyl, 2-ethyl-4-methylpentyl, 3-ethyl-2-methylpentyl, 4-ethyl-3-methylpentyl, 3-ethyl-4-methylpentyl, 4-ethyl-3-methylpentyl, 1-(2-methylpropyl)butyl, 1-(2-methylpropyl)-2-methylbutyl, 1,1-(2-methylpropyl)ethyl, 1,1-(2-methylpropyl)ethylpropyl, 1,1-diethylpropyl, 2,2-diethylpropyl, 1,1-ethylmethyl-2,2-dimethylpropyl, 2,2-ethylmethyl-1,1-dimethylpropyl, 2-ethyl-1,1-dimethylbutyl, 2,3-dimethylcyclohexyl, 2,4-dimethylcyclohexyl, 2,5-dimethylcyclohexyl, 2,6-dimethylcyclohexyl, 3,5-dimethylcyclohexyl, 2-methylcyclohexylmethyl, 3-methylcyclohexylmethyl, 4-methylcyclohexylmethyl, 2-ethylcyclohexyl, 3-ethylcyclohexyl, 4-ethylcyclohexyl, 2-cyclohexylethyl, 1-cyclohexylethyl, 1-cyclohexyl-2-ethylene, nonyl, isononyl, decyl, isodecyl, undecyl, dodecyl, benzyl, and 2-phenylethyl.

Among them, methyl, ethyl, n-propyl, 2-propyl, n-butyl, isobutyl, t-butyl, n-pentyl, 1-ethylpropyl, 1-methylbutyl, 2-methylbutyl, 3-methylbutyl, amyl, cyclopentyl, n-hexyl, cyclohexyl, 1-ethylbutyl, 2-ethylbutyl, 3-ethylbutyl, 1-methylpentyl, 2-methylpentyl, 3-methylpentyl, 4-methylpentyl, n-heptyl, 1-methylhexyl, 2-methylhexyl, 3-methylhexyl, 4-methylhexyl, 5-methylhexyl, 1-ethylpentyl, 2-ethylpentyl, 3-ethylpentyl, 2-methylcyclohexyl, 3-methylcyclohexyl, 4-methylcyclohexyl, n-octyl, 2-octyl, 3-octyl, 4-octyl, 2-methylheptyl, 3-methylheptyl, 4-methylheptyl, 5-methylheptyl, 6-methylheptyl, 2-ethylhexyl, 3-ethylhexyl, 4-ethylhexyl, 5-ethylhexyl, nonyl, isononyl, decyl, isodecyl, undecyl, dodecyl, benzyl, and the like are preferable as the hydrocarbon group of $R^{31}$.

Among them, methyl, ethyl, n-propyl, 2-propyl, n-butyl, isobutyl, t-butyl, n-pentyl, 1-ethylpropyl, 1-methylbutyl, 2-methylbutyl, 3-methylbutyl, amyl, cyclopentyl, n-hexyl, cyclohexyl, n-heptyl, n-octyl, 2-octyl, 3-octyl, 4-octyl, 2-methylheptyl, 3-methylheptyl, 4-methylheptyl, 5-methylheptyl, 6-methylheptyl, 2-ethylhexyl, 3-ethylhexyl, 4-ethylhexyl, 5-ethylhexyl, nonyl, isononyl, decyl, isodecyl, undecyl, dodecyl, benzyl, and the like are more preferable as the hydrocarbon group of $R^{31}$.

Among them, methyl, ethyl, n-propyl, 2-propyl, n-butyl, isobutyl, t-butyl, n-pentyl, amyl, cyclopentyl, n-hexyl, cyclohexyl, n-heptyl, n-octyl, 2-octyl, 3-octyl, 4-octyl, 2-methylheptyl, 3-methylheptyl, 4-methylheptyl, 5-methylheptyl, 6-methylheptyl, 2-ethylhexyl, 3-ethylhexyl, 4-ethylhexyl, 5-ethylhexyl, nonyl, isononyl, decyl, isodecyl, undecyl, dodecyl, benzyl, and the like are still more preferable as the hydrocarbon group of $R^{31}$.

Specific examples of the hydrocarbon group of $R^{32}$ include methylene, ethylene, trimethylene, 1,2-propylene, tetramethylene, 2-methyl-1,3-trimethylene, 1,1-dimethylethylene, pentamethylene, 1-ethyl-1,3-propylene, 1-methyl-1,4-butylene, 2-methyl-1,4-butylene, 3-methyl-1,4-butylene, 2,2-dimethyl-1,3-propylene, 1,2-cyclopentylene, 1,3-cyclopentylene, 2,2-dimethyl-1,3-propylene, 1,1-dimethyl-1,3-propylene, 3,3-dimethyl-1,3-propylene, hexamethylene, 1,2-cyclohexylene, 1,3-cyclohexylene, 1,4-cyclohexylene, 1-ethyl-1,4-butylene, 2-ethyl-1,4-butylene, 3-ethyl-1,4-butylene, 1-methyl-1,5-pentylene, 2-methyl-1,5-pentylene, 3-methyl-1,5-pentylene, 4-methylpentylene, 1,1-dimethyl-1,4-butylene, 2,2-dimethyl-1,4-butylene, 3,3-dimethyl-1,4-butylene, 1,2-dimethyl-1,4-butylene, 1,3-dimethyl-1,4-butylene, 2,3-dimethyl-1,4-butylene, heptamethylene, 1-methyl-1,6-hexylene, 2-methyl-1,6-hexylene, 3-methyl-1,6-hexylene, 4-methyl-1,6-hexylene, 5-methyl-1,6-hexylene, 1-ethyl-1,5-pentylene, 2-ethyl-1,5-pentylene, 3-ethyl-1,5-pentylene, 1,1-dimethyl-1,5-pentylene, 2,2-dimethyl-1,5-pentylene, 3,3-dimethyl-1,5-pentylene, 4,4-dimethyl-1,5-pentylene, 1,2-dimethyl-1,5-pentylene, 1,3-dimethyl-1,5-pentylene, 1,4-dimethyl-1,5-pentylene, 2,3-dimethyl-1,5-pentylene, 2,4-dimethyl-1,5-pentylene, 3,4-dimethyl-1,5-pentylene, 2-methyl-3,3-dimethyl-1,4-butylene, 1-methyl-3,3-dimethyl-1,4-butylene, 1,2,3-trimethyl-1,4-butylene, 1,3-dimethyl-1,4-pentylene, 2-isopropyl-1,4-butylene, 2-methyl-1,4-cyclohexylene, 3-methyl-1,4-cyclohexylene, 4-methyl-1,4-cyclohexylene, 1-cyclohexylmethylene, 2-ethyl-1,3-cyclopentylene, 3-ethyl-1,3-cyclopentylene, 2,3-dimethyl-1,3-cyclopentylene, 2,4-dimethyl-1,3-cyclopentylene, 2-methyl-1,3-cyclopentylmethylene, 2-cyclopentylethylene, 1-cyclopentylethylene, octamethylene, 1-methyl-1,7-heptylene, 1-ethyl-1,6-hexylene, 1-propyl-1,5-pentylene, 2-methyl-1,7-heptylene, 3-methyl-1,7-heptylene, 4-methyl-1,7-heptylene, 5-methyl-1,7-heptylene, 6-methyl-1,7-heptylene, 2-ethyl-1,6-hexylene, 3-ethyl-1,6-hexylene, 4-ethyl-1,6-hexylene, 5-ethyl-1,6-hexylene, 1,1-dimethyl-1,6-hexylene, 2,2-dimethyl-1,6-hexylene, 3,3-dimethyl-1,6-hexylene, 4,4-dimethyl-1,6-hexylene, 5,5-dimethyl-1,6-hexylene, 1,2-dimethyl-1,6-hexylene, 1,3-dimethyl-1,6-hexylene, 1,4-dimethyl-1,6-hexylene, 1,5-dimethyl-1,6-hexylene, 2,3-dimethyl-1,6-hexylene, 2,4-dimethyl-1,6-hexylene, 2,5-dimethyl-1,6-hexylene, 1,1-ethylmethyl-1,5-pentylene, 2,2-ethylmethyl-1,5-pentylene, 3,3-ethylmethyl-1,5-pentylene, 4,4-ethylmethyl-1,5-pentylene, 1-ethyl-2-methyl-1,5-pentylene, 1-ethyl-3-methyl-1,5-pentylene, 1-ethyl-4-methyl-1,5-pentylene, 2-ethyl-1-methyl-1,5-pentylene, 3-ethyl-1-methyl-1,5-pentylene, 4-ethyl-1-methyl-1,5-pentylene, 2-ethyl-3-methyl-1,5-pentylene, 2-ethyl-4-methyl-1,5-pentylene, 3-ethyl-2-methyl-1,5-pentylene, 4-ethyl-3-methyl-1,5-pentylene, 3-ethyl-4-methyl-1,5-pentylene, 4-ethyl-3-methyl-1,5-pentylene, 1-(2-methylpropyl)-1,4-butylene, 1-(2-methylpropyl)-2-methyl-1,4-butylene, 1,1-(2-methylpropyl)ethylene, 1,1-(2-methylpropyl)ethyl-1,3-propylene, 1,1-diethyl-1,3-propylene, 2,2-diethyl-1,3-propylene, 1,1-ethylmethyl-2,2-dimethyl-1,3-propylene, 2,2-ethylmethyl-1,1-dimethyl-1,3-propylene, 2-ethyl-1,1-dimethyl-1,4-butylene, 2,3-dimethyl-1,4-cyclohexylene, 2,4-dimethyl-1,4-cyclohexylene, 2,5-dimethyl-1,4-cyclohexylene, 2,6-dimethyl-1,4-cyclohexylene, 3,5-dimethyl-1,4-cyclohexylene, 2-methyl-1,4-cyclohexyl-1-methylene, 3-methyl-1,4-cyclohexyl-1-methylene, 4-methyl-1,4-cyclohexyl-1-methylene, 2-ethyl-1,4-cyclohexylene, 3-ethyl-1,4-cyclohexylene, 4-ethyl-1,4-cyclohexylene, 2-cyclohexylethylene, 1-cyclohexylethylene, 1-cyclohexyl-2-ethylene, nonylmethylene, 1-methyl-1,8-octylene, decylmethylene, 1-methyl-1,8-nonylene, undecylmethylene, dodecylmethylene, 1,4-phenylene, 1,3-phenylene, 1,2-phenylene, methylene-1,4-phenylene-methylene, and ethylene-1,4-phenylene-ethylene.

Among them, methylene, ethylene, trimethylene, 1,2-propylene, tetramethylene, 2-methyl-1,2-propylene, 1,1-dimethylethylene, pentamethylene, 1-ethyl-1,3-propylene, 1-methyl-1,4-butylene, 2-methyl-1,4-butylene, 3-methyl-1,4-butylene, 2,2-dimethyl-1,3-propylene, 1,3-cyclopentylene, 1,6-hexamethylene, 1,4-cyclohexylene, 1-ethyl-1,4-butylene, 2-ethyl-1,4-butylene, 3-ethyl-1,4-butylene, 1-methyl-1,5-pentylene, 2-methyl-1,5-pentylene, 3-methyl-1,5-pentylene, 4-methyl-1,5-pentylene, heptamethylene, 1-methyl-1,6-hexylene, 2-methyl-1,6-hexylene, 3-methyl-1,6-hexylene, 4-methyl-1,6-hexylene, 5-methyl-1,6-hexylene, 1-ethyl-1,5-pentylene, 2-ethyl-1,5-pentylene, 3-ethyl-1,5-pentylene, 2-methyl-1,4-cyclohexylene, 3-methyl-1,4-cyclohexylene, 4-methyl-1,4-cyclohexylene, octamethylene, 1-methyl-1,7-heptylene, 3-methyl-1,7-heptylene, 4-methyl-1,7-heptylene, 2-methyl-1,7-heptylene, 5-methyl-1,7-heptylene, 6-methyl-1,7-heptylene, 2-ethyl-1,6-hexylene, 3-ethyl-1,6-hexylene, 4-ethyl-1,6-hexylene, 5-ethyl-1,6-hexylene, nonylmethylene, decylmethylene, undecylmethylene, dodecylmethylene, and the like are preferable as the hydrocarbon group of $R^{32}$.

Among them, methylene, ethylene, trimethylene, 1,2-propylene, tetramethylene, 2-methyl-1,2-propylene, 1,1-dimethylethylene, pentamethylene, 1-ethyl-1,3-propylene, 1-methyl-1,4-butylene, 2-methyl-1,4-butylene, 3-methyl-1,4-butylene, 2,2-dimethyl-1,3-propylene, 1,3-cyclopentylene, 1,6-hexamethylene, 1,4-cyclohexylene, heptamethylene, octamethylene, 1-methyl-1,7-heptylene, 3-methyl-1,7-heptylene, 4-methyl-1,7-heptylene, 2-methyl-1,7-heptylene, 5-methyl-1,7-heptylene, 6-methyl-1,7-heptylene, 2-ethyl-1,6-hexylene, 3-ethyl-1,6-hexylene, 4-ethyl-1,6-hexylene, 5-ethyl-1,6-hexylene, nonylmethylene, decylmethylene, undecylmethylene, dodecylmethylene, and the like are more preferable as the hydrocarbon group of $R^{32}$.

Among them, methylene, ethylene, trimethylene, 1,2-propylene, tetramethylene, 2-methyl-1,2-propylene, 1,1-dimethylethylene, pentamethylene, 2,2-dimethyl-1,3-propylene, 1,3-cyclopentylene, 1,6-hexamethylene, 1,4-cyclohexylene, heptamethylene, octamethylene, 1-methyl-1,7-heptylene, 3-methyl-1,7-heptylene, 4-methyl-1,7-heptylene, 2-methyl-1,7-heptylene, 5-methyl-1,7-heptylene, 6-methyl-1,7-heptylene, 2-ethyl-1,6-hexylene, 3-ethyl-1,6-hexylene, 4-ethyl-1,6-hexylene, 5-ethyl-1,6-hexylene, nonylmethylene, decylmethylene, undecylmethylene, dodecylmethylene, and the like are still more preferable as the hydrocarbon group of $R^{32}$.

Specific examples of a functional group containing a carbon-carbon double bond of A include a vinyl group, an allyl group, an isopropenyl group, a 1-butenyl group, a 1-pentenyl group, a p-vinylphenyl group, a p-isopropenylphenyl group, a m-vinylphenyl group, a m-isopropenylphenyl group, an o-vinylphenyl group, an o-isopropenylphenyl group, a p-vinylbenzyl group, a p-isopropenylbenzyl group, a m-vinylbenzyl group, a m-isopropenylbenzyl group, an o-vinylbenzyl group, an o-isopropenylbenzyl group, a p-vinylphenylethenyl group, a p-vinylphenylpropenyl group, a p-vinylphenylbutenyl group, a m-vinylphenylethenyl group, a m-vinylphenylpropenyl group, a m-vinylphenylbutenyl group, an o-vinylphenylethenyl group, an o-vinylphenylpropenyl group, an o-vinylphenylbutenyl group, a methacryl group, an acryloyl group, a 2-ethylacryl group, and a 2-hydroxymethylacryl group.

L in formula (1c) or formula (1d) is an arbitrary divalent linking group. Specific examples of L include a linking group having a structure represented by the following formula. Here, a, $R^5$, k, X, Y, and n are as defined in the description of formula (1a), formula (1b), formula (1c), or formula (1d).

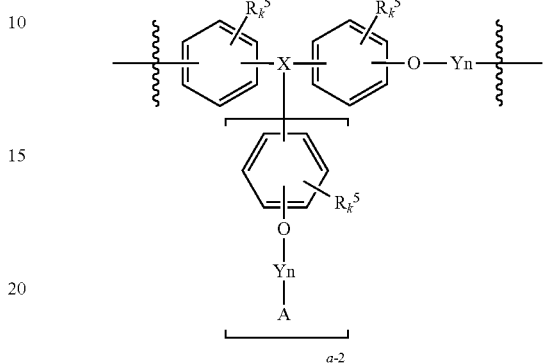

a-2

The structure of formula (1a), formula (1b), formula (1c), or formula (1d) may take various branched structures according to the value of "a" which represents a valence of X. For example, when a=3, examples thereof include the structures represented by the following formulae.

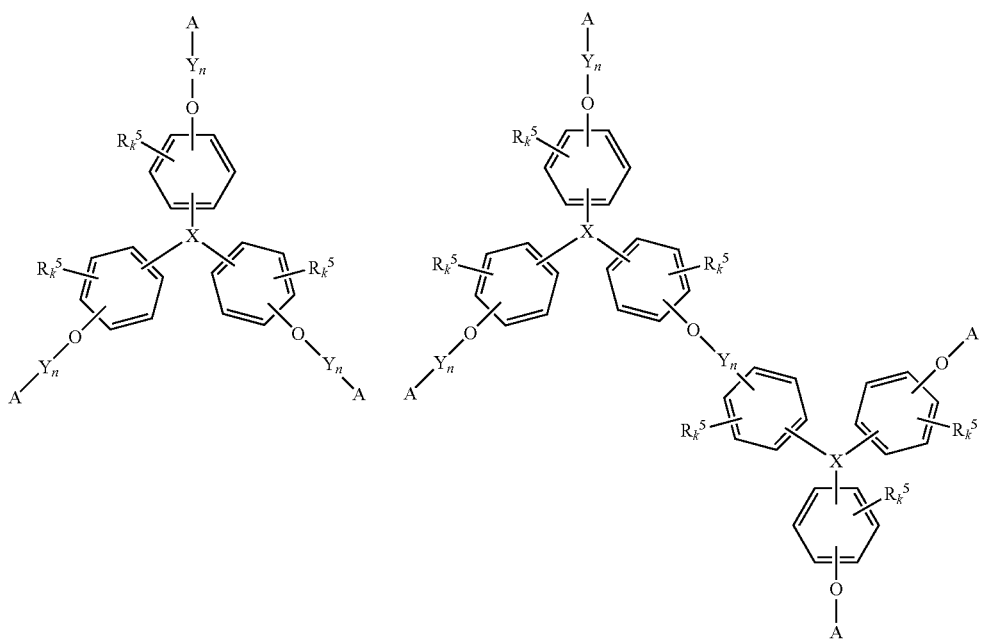

-continued
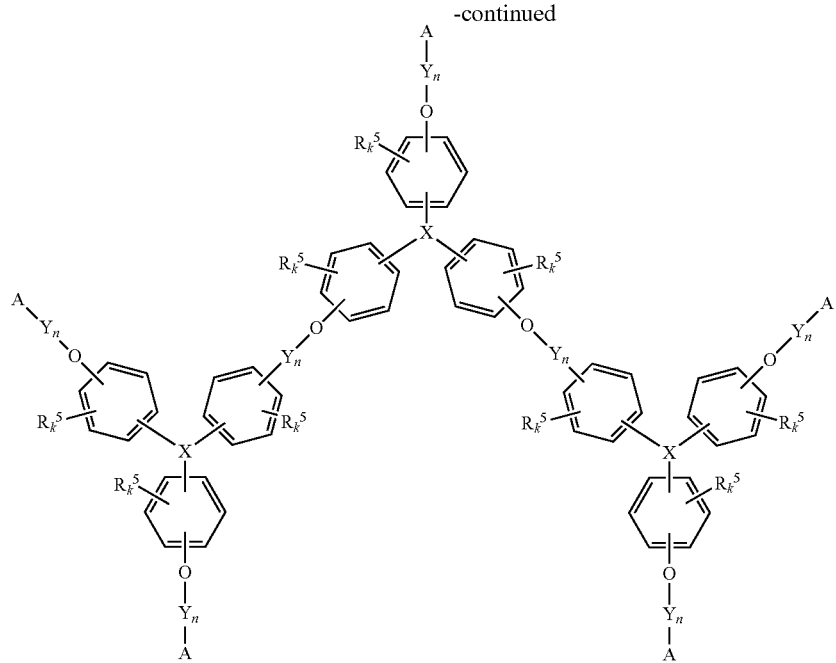
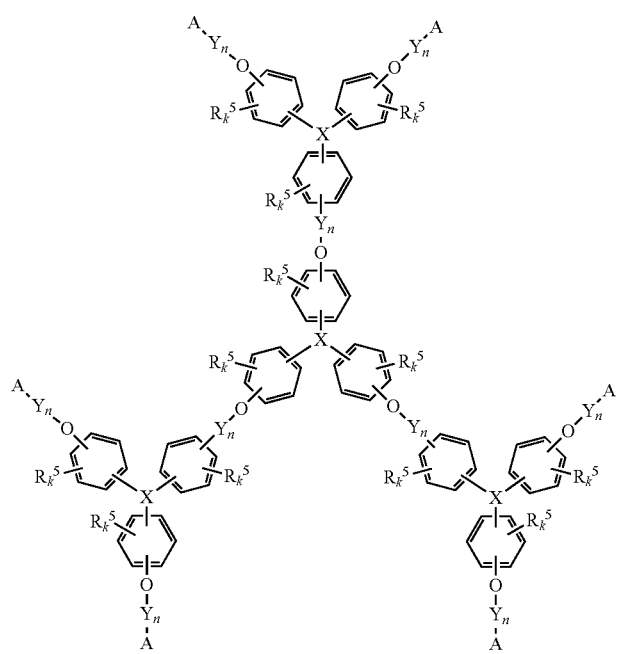
In the above formulae, n represents the number of repetitions of Y and is an integer of 0 to 200.

While a structure of the compound represented by formula (1c) or formula (1d) is not particularly limited, examples thereof include the structures shown below.
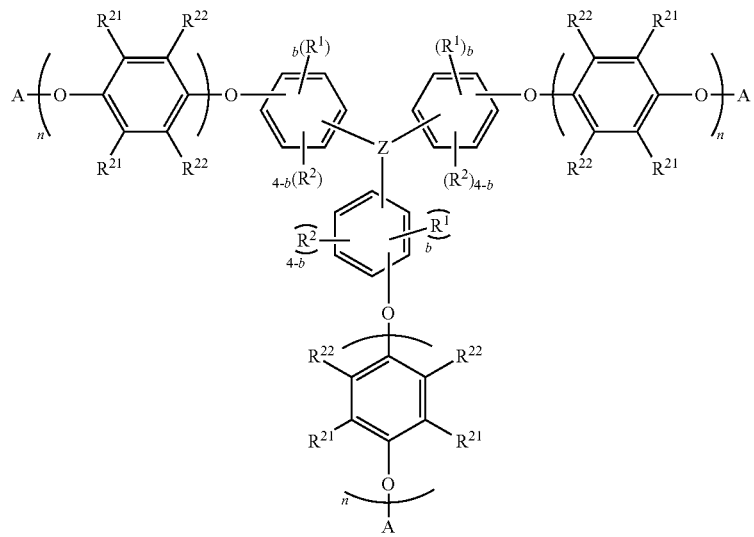
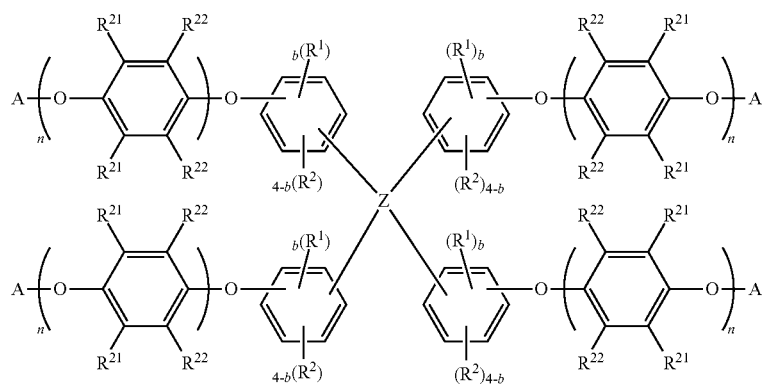

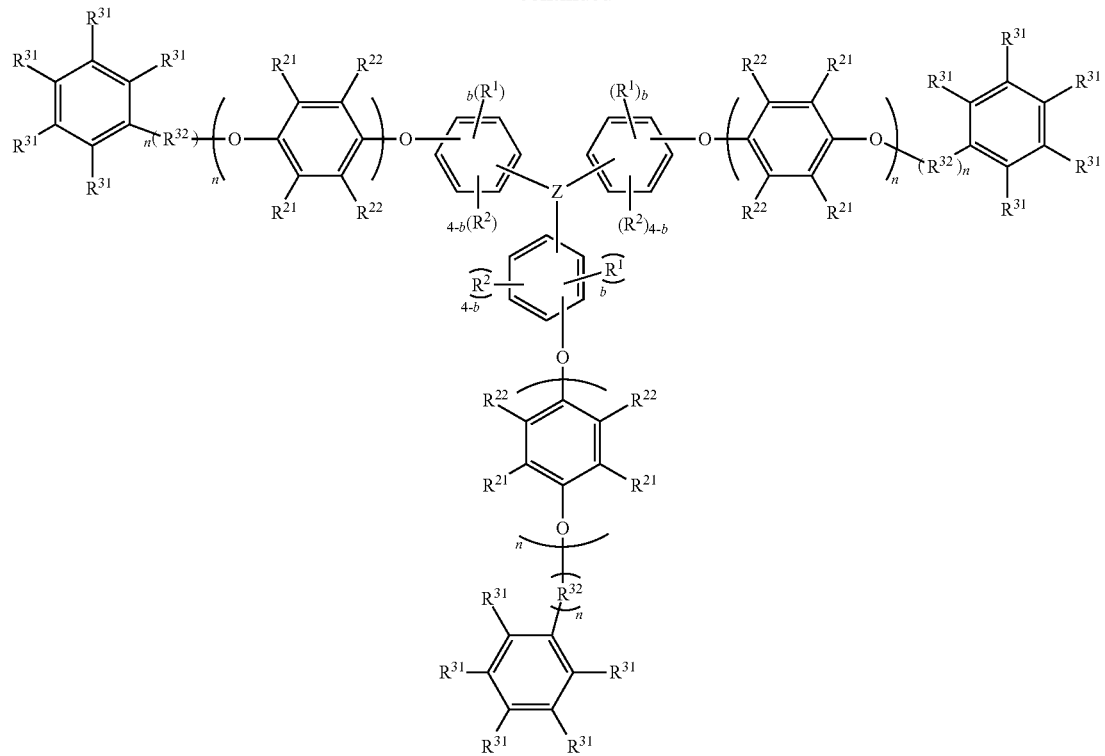
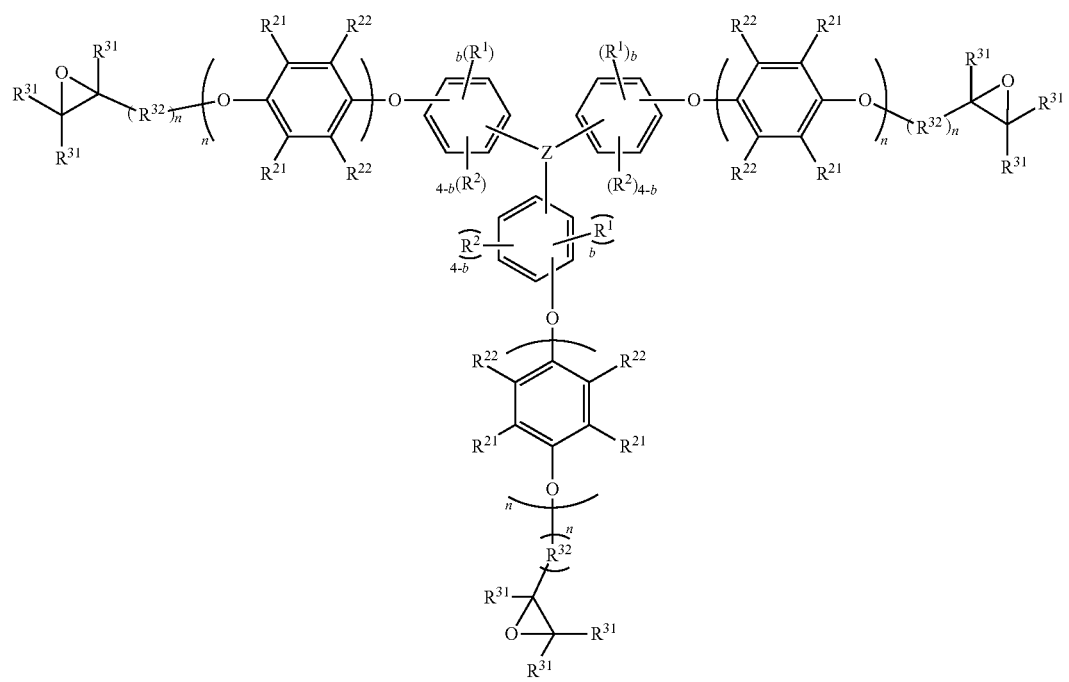

In the above formulae, Z is an arbitrary linking group corresponding to X in formula (1c) or formula (1d).

Each $R^1$ is independently a substituent represented by formula (2), and b is an integer of 1 to 4. A bonding position of $R^1$ on the benzene ring is not particularly limited, and $R_1$ can be bonded to any position. When b is two or more, a plurality of $R^1$ may take the same structure or different structures from one another. Examples of $R^1$ include an isopropyl group, an isobutyl group, a sec-butyl group, a tert-butyl group, a tert-amyl group, a 2,2-dimethylpropyl group, and a structure having a phenyl group at a terminal of these groups.

A is a substituent containing a carbon-carbon double bond and/or an epoxy bond. Specific examples thereof include substituents represented by formulae (4) to (8).

Each $R^2$ is independently a hydrogen atom or a hydrocarbon group having a linear or cyclic structure having 1 to 8 carbon atoms. Specific examples of $R^2$ include a methyl group, an ethyl group, a n-propyl group, a n-butyl group, a n-pentyl group, a cyclopentyl group, a n-hexyl group, a cyclohexyl group, a n-heptyl group, a n-octyl group, a phenyl group, a benzyl group, and a 2-ethylhexyl group, for example. Among them, a hydrogen atom, a methyl group, an ethyl group, a n-propyl group, a n-butyl group, a n-pentyl group, a cyclopentyl group, a n-hexyl group, a cyclohexyl group, a n-heptyl group, and a n-octyl group are preferable in terms of reactivity in synthesis and the like. When reactivity in synthesis can also be controlled by the position of $R^2$ or by appropriately setting reaction conditions in synthesis, the structure of $R^2$ is not limited and may be any structure as long as it has 1 to 8 carbon atoms. However, $R^2$ is not the same group as the substituent represented by formula (2).

Z is a hydrocarbon group; a hydrocarbon group containing one or more elements selected from nitrogen, phosphorus, silicon, and oxygen; or an element such as nitrogen, phosphorus, silicon, or the like or a group including such an element.

When Z is a hydrocarbon group, specific examples thereof include the following structures.

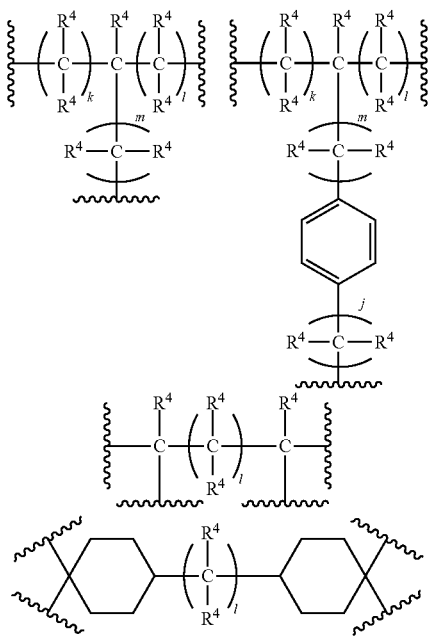

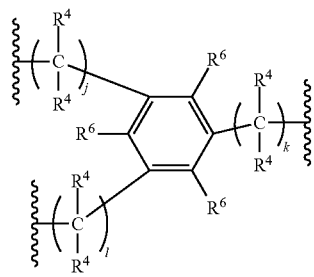

In the above formulae, each $R^4$ independently represents a hydrogen atom or a C1 to C8 hydrocarbon group. Each $R^6$ independently represents a hydrogen atom or a C1 to C6 hydrocarbon group. Each of j, k, l, and m is independently an integer of 1 to 4.

Specific examples of $R^4$ include a hydrogen atom, a methyl group, an ethyl group, a n-propyl group, an isopropyl a n-butyl group, an isobutyl group, a t-butyl group, a n-pentyl group, a 2-pentyl group, a 3-pentyl group, a cyclopentyl group, a n-hexyl group, a 2-hexyl group, a 3-hexyl group, a cyclohexyl group, a n-heptyl group, a 2-heptyl group, a 3-heptyl group, a n-octyl group, and a 2-ethylhexyl group.

Specific examples of $R^6$ include a hydrogen atom, a methyl group, an ethyl group, a n-propyl group, an isopropyl a n-butyl group, an isobutyl group, a n-pentyl group, a 2-pentyl group, a 3-pentyl group, a cyclopentyl group, a n-hexyl group, a 2-hexyl group, a 3-hexyl group, and a cyclohexyl group.

Specific examples of the hydrocarbon group containing one or more elements selected from nitrogen, phosphorus, silicon, and oxygen include the structures shown below.

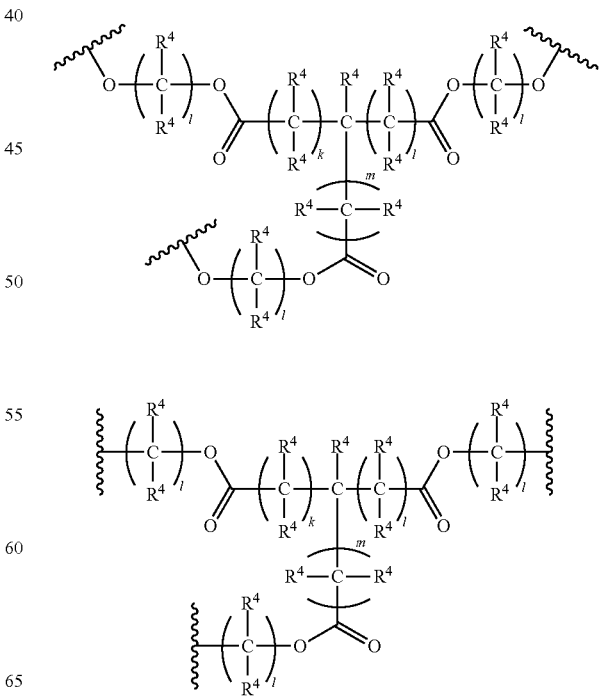

-continued

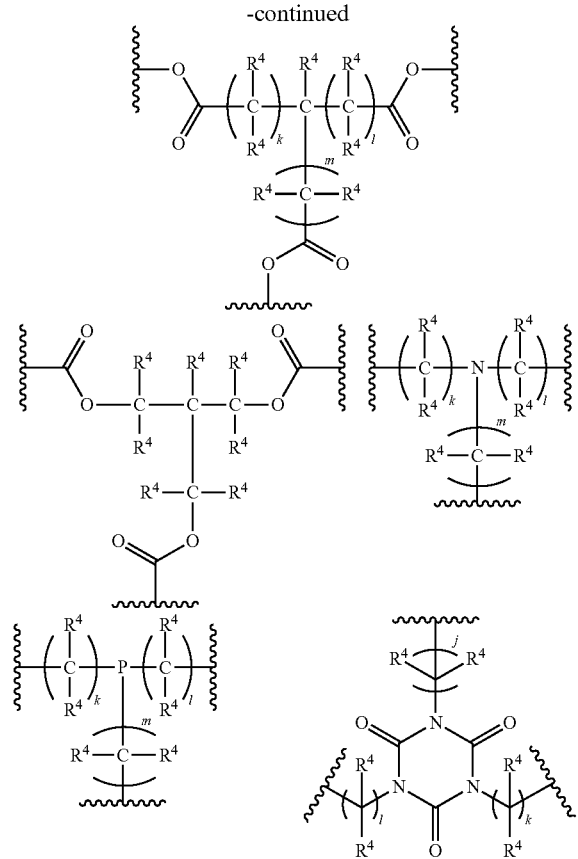

In the above formulae, each $R^4$ independently represents a hydrogen atom or a C1 to C8 hydrocarbon group. Each of j, k, l, and m is independently an integer of 1 to 4.

Specific examples of $R^4$ include a hydrogen atom, a methyl group, an ethyl group, a n-propyl group, a isopropyl a n-butyl group, an isobutyl group, a t-butyl group, a n-pentyl group, a 2-pentyl group, a 3-pentyl group, a cyclopentyl group, a n-hexyl group, a 2-hexyl group, a 3-hexyl group, a cyclohexyl group, a n-heptyl group, a 2-heptyl group, a 3-heptyl group, a n-octyl group, and a 2-ethylhexyl group.

When Z is an element such as nitrogen, phosphorus, silicon, or the like or a group including such an element, examples thereof include the following structures.

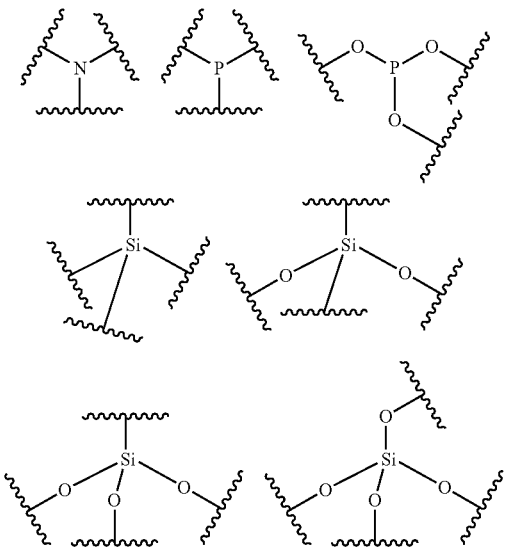

The following structure is obtained when the structure represented by A is specifically represented by the first structure of the above specific examples. The same applies to the cases of 4 to 6 branched structures.

$R^{31}$, $R^{32}$, s, and t in the following structure are as defined in the specific examples of A.

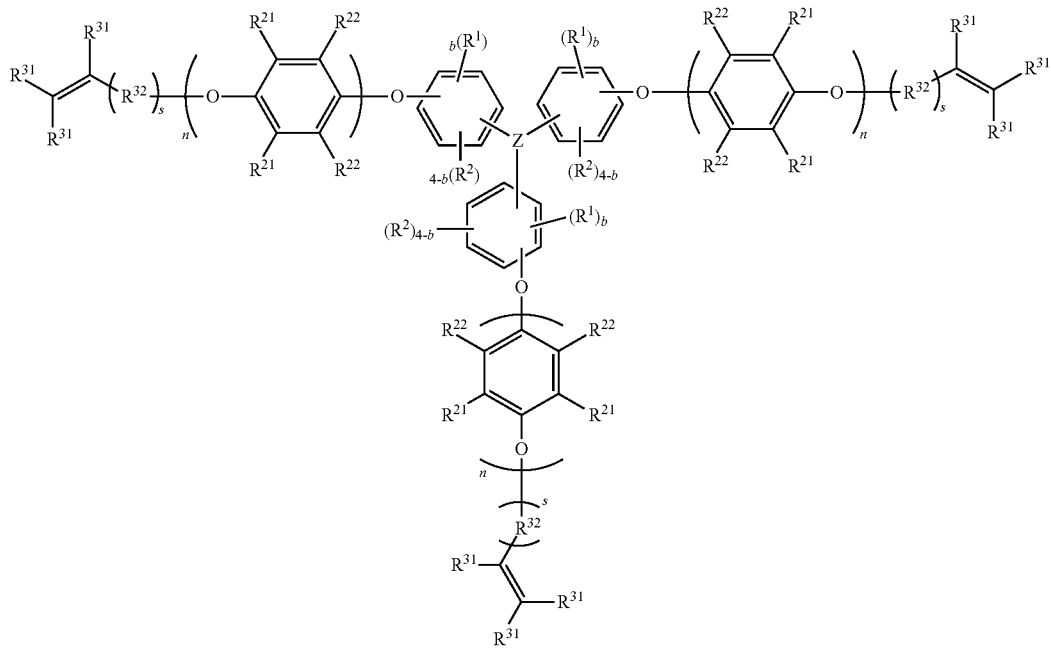

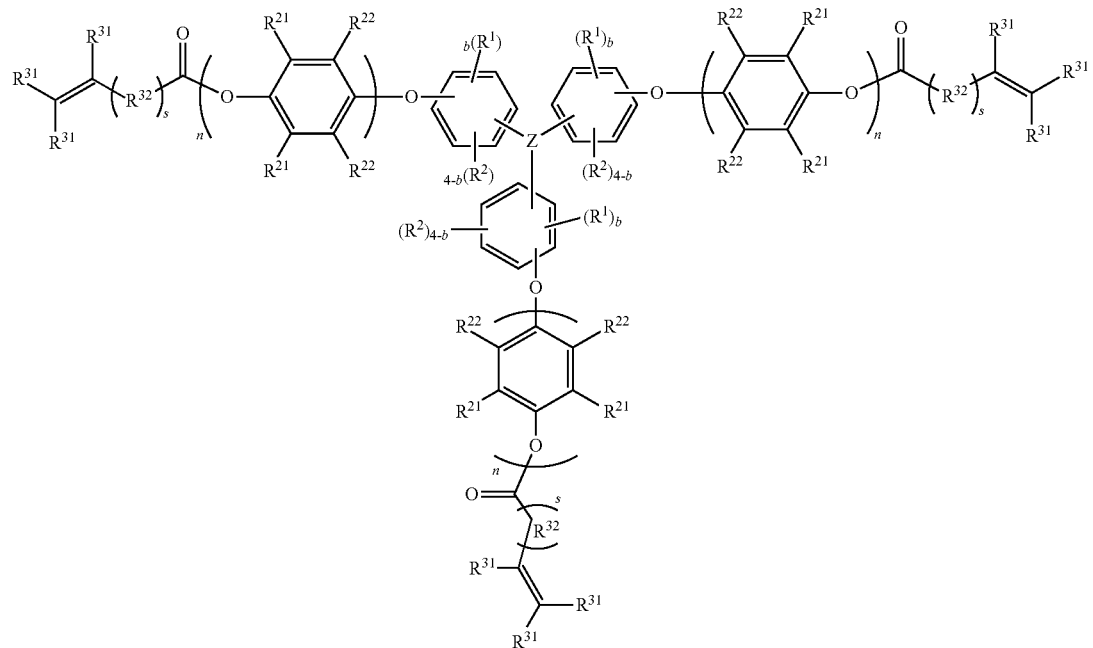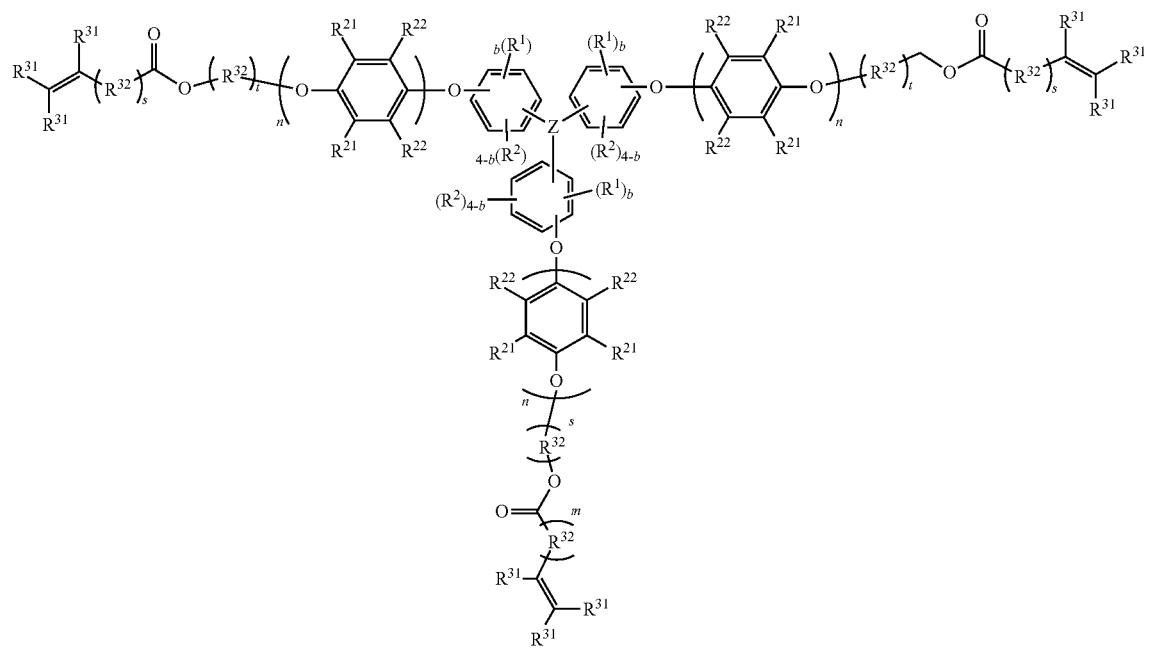

-continued

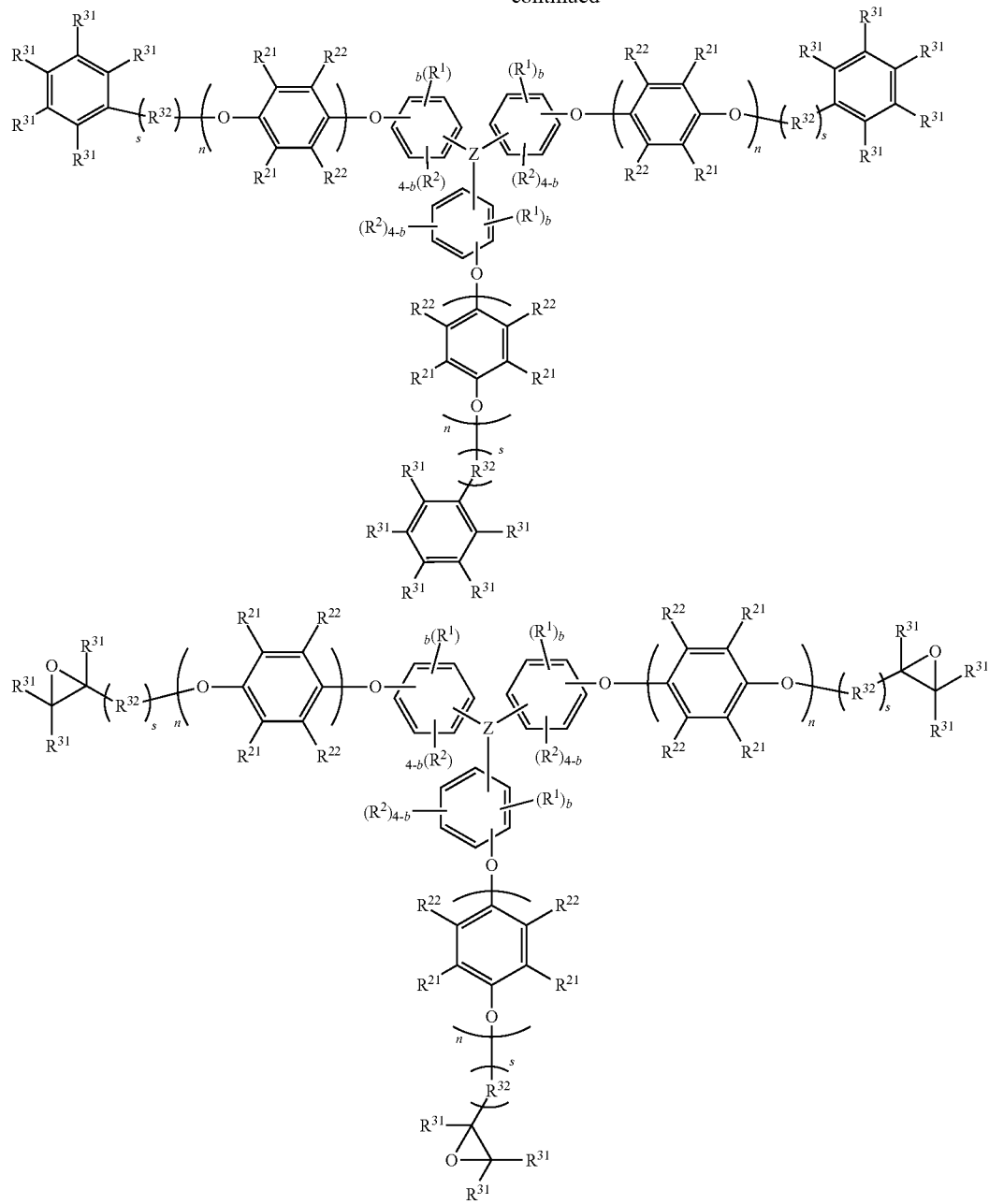

A molecular weight range of the polyphenylene ether in the present embodiment is not particularly limited. Among others, a number-average molecular weight (Mn) of the polyphenylene ether is preferably 500 to 30000, more preferably 700 to 15000, and still more preferably 700 to 10000. When the number-average molecular weight (Mn) of the polyphenylene ether falls within the above range, flowability of the polyphenylene ether dissolved in a solvent tends to be further improved.

A molecular weight distribution of the polyphenylene ether represented by Mw (weight-average molecular weight)/Mn is preferably 1.1 to 5, more preferably 1.4 to 4, and still more preferably 1.5 to 3. The number-average molecular weight (Mn) and the weight-average molecular weight (Mw) described above mean molecular weights in terms of polystyrene obtained by using GPC.

[Manufacturing Method of Polyphenylene Ether]

The polyphenylene ether represented by formula (1a) or formula (1c) in the present embodiment can be prepared by a redistribution reaction method using a higher molecular weight polyphenylene ether polymer (hereinafter, also referred to as a "starting material polyphenylene ether"), for example. The polyphenylene ether represented by formula (1b) or formula (1d) can be manufactured by introducing a substituent represented by A into a terminal of the polyphenylene ether represented by formula (1a) or formula (1c) obtained in the above-described manner.

Hereinafter, the polyphenylene ether represented by formula (1a) or formula (1c) obtained by a redistribution reaction method is referred to as an "H-type polyphenylene ether," and the polyphenylene ether obtained by introducing a substituent represented by A is referred to as an "A-type polyphenylene ether."

Manufacturing of the H-type polyphenylene ether using a redistribution reaction method can be carried out according to known reaction conditions. In this case, a resultant H-type polyphenylene ether has a molecular weight lower than that of the starting material polyphenylene ether. Therefore, a ratio between the starting material polyphenylene ether and an a-valent (a=3 to 6) phenol compound containing the group represented by formula (2) (hereinafter, also referred to as a "polyfunctional phenol compound") needs to be adjusted based on a target molecular weight.

The manufacturing method (redistribution reaction method) of the present embodiment includes a step of reacting an arbitrary starting material polyphenylene ether with the polyfunctional phenol compound.

Specifically, redistribution reaction can be proceeded by adding an a-valent polyfunctional phenol compound represented by the following formula (9), which is capable of inducing a part of the structure of formula (1a), formula (1b), formula (1c), or formula (1d), and a starting material polyphenylene ether to a solvent at a predetermined ratio under an inert gas atmosphere, heating the reaction system to a reaction temperature, and subsequently feeding a radical initiator diluted in a solvent to the reaction system, for example.

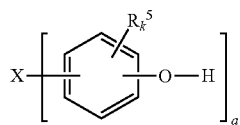

Formula (9)

In the formula, X, $R^5$, k, and a are identical with those defined for formula (1a), formula (1b), formula (1c), or formula (1d).

The a-valent polyfunctional phenol compound represented by formula (9) is preferably a compound having any one of the following structures.

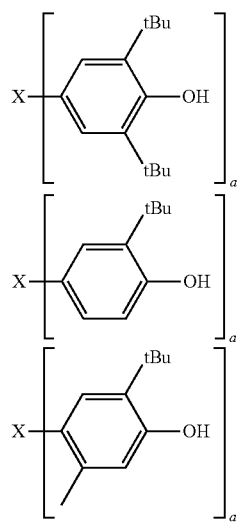

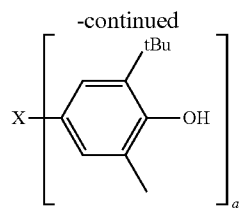

It is preferable that the solvent used in redistribution reaction is capable of dissolving starting materials therein, has low reactivity with the radical initiator, and has a boiling point enabling the solvent to be heated to a temperature at which the radical initiator can decompose. Especially, in the manufacturing method of the present embodiment which uses a polyfunctional phenol compound, a non-polar solvent can be used as the solvent.

Reaction may be carried out at a temperature equal to or less than the boiling point under normal pressure or may be carried out under a refluxing condition but is not particularly limited thereto. When the boiling point of a solvent used is too low, reaction can be carried out in a pressurized reactor such as an autoclave.

Specific examples of the solvent include benzene, m-xylene, o-xylene, p-xylene, toluene, cumene, ethylbenzene, n-propylbenzene, anisole, tetrahydrofuran, dioxane, ethylene glycol dimethyl ether, acetone, methyl ethyl ketone, methyl isobutyl ketone, acetophenone, diethyl ketone, methyl-n-butyl ketone, cyclopentanone, cyclohexanone, tetrahydrofuran, cyclohexane, octane, hexane, cyclopentane, ethyl acetate, butyl acetate, and chloroform, for example.

Among them, preferable examples of the solvent include benzene, m-xylene, o-xylene, p-xylene, toluene, ethylbenzene, n-propylbenzene, anisole, tetrahydrofuran, dioxane, ethylene glycol dimethyl ether, methyl ethyl ketone, methyl isobutyl ketone, acetophenone, methyl-n-butyl ketone, cyclopentanone, cyclohexanone, tetrahydrofuran, cyclohexane, octane, ethyl acetate, butyl acetate, and chloroform.

More preferable examples of the solvent include benzene, m-xylene, o-xylene, p-xylene, toluene, ethylbenzene, n-propylbenzene, anisole, tetrahydrofuran, dioxane, ethylene glycol dimethyl ether, methyl ethyl ketone, methyl isobutyl ketone, acetophenone, methyl-n-butyl ketone, cyclohexanone, tetrahydrofuran, ethyl acetate, butyl acetate, chloroform, and a mixed solvent system thereof.

A number-average molecular weight of the starting material polyphenylene ether is preferably 5000 to 100000, more preferably 5000 to 50000, and still more preferably 5000 to 30000. The number-average molecular weight of the starting material polyphenylene ether is not limited to the above ranges and can be appropriately adjusted according to a purpose.

A concentration of the starting material polyphenylene ether at the time of reaction is preferably 0.5% to 70% by mass, more preferably 5% to 65% by mass, and still more preferably 10% to 60% by mass based on the total amount of a reaction liquid. The concentration of the starting material polyphenylene ether is not limited to the above ranges and can be appropriately adjusted according to a purpose. Especially, the concentration of the starting material polyphenylene ether is preferably adjusted to fall within a range allowing the starting material polyphenylene ether to completely dissolve and allowing the reaction liquid to be stirred.

Since the ratio between the polyfunctional phenol compound and the starting material polyphenylene ether is determined according to a target molecular weight of the H-type polyphenylene ether, the ratio can be arbitrarily set according to the target molecular weight.

In the present embodiment, a charging ratio at the time of reaction can be represented by a ratio between hydroxy groups in the polyfunctional phenol compound and hydroxy groups in the starting material polyphenylene ether, for example. An amount of hydroxy group per one mole of the polyfunctional phenol compound can be calculated from its molecular structure, and an amount of hydroxy group per one mole of the starting material polyphenylene ether can be calculated on the basis of its number-average molecular weight. When a polymer having a hydroxy group at one terminal thereof and a polymer having hydroxy groups at both terminals thereof are mixed in the starting material polyphenylene ether depending on the polymerization method employed, an amount of hydroxy group may be corrected by NMR measurement or the like.

The ratio of an amount of hydroxy group in the polyfunctional phenol compound to an amount of hydroxy group in the starting material polyphenylene ether (amount of hydroxy group in polyfunctional phenol compound/amount of hydroxy group in starting material phenol) is preferably 0.5/100 to 80/100, more preferably 1/100 to 50/100, and still more preferably 5/100 to 30/100 at the time of reaction. The ratio of an amount of hydroxy group in the polyfunctional phenol compound to an amount of hydroxy group in the starting material polyphenylene ether is not limited to the above ranges and can be appropriately adjusted according to a purpose.

A charging method of the polyfunctional phenol compound and the starting material polyphenylene ether is not particularly limited. A reactor may be charged with both of them at their whole amounts in advance before initiating reaction, or charging amounts may be divided and added to the reaction system according to a purpose, for example. Besides, a solution which is obtained by dissolving the polyfunctional phenol compound or the starting material polyphenylene ether in a solvent in advance may be continuously added to the reaction system after initiating reaction.

Any peroxide capable of generating a radical can be used as the radical initiator used for reaction, for example.

Examples of the peroxide are not particularly limited but include p-menthane hydroperoxide, benzoyl peroxide, dilauroyl peroxide, di(3,5,5-trimethylhexanoyl) peroxide, disuccinic acid peroxide, diisobutyryl peroxide, di-n-propyl peroxydicarbonate, diisopropyl peroxydicarbonate, di-2-ethylhexyl peroxydicarbonate, bis(4-t-butylcyclohexyl) peroxydicarbonate, di-sec-butyl peroxydicarbonate, t-butyl peroxyisopropylmonocarbonate, t-butylperoxyneodecanoate, t-butylperoxy-2-ethylhexanoate, t-butylperoxypivalate, t-butylperoxybenzoate, t-butylperoxy-3-methylbenzoate, t-butylperoxy-2-ethylhexylmonocabonate, t-butylperoxy-3,5,5-trimethylhexanoate, t-butylperoxylaurate, t-butylperoxyacetate, 2,5-dimethyl-2,5-di(t-butylperoxy)hexane, benzoyl m-methylbenzoyl peroxyde, m-toluyl peroxide, 1,1,3,3-tetramethylbutylhydroperoxide, 1,1,3,3-tetramethylbutylhydroperoxy neodecanoate, 1,1,3,3-tetramethylbutylhydroperoxy-2-ehtylhexanoate, cumene hydroperoxide, cumylperoxyneodecanoate, diisobutylbenzenehydroperoxide, 2,2-bis(4,4-di-t-butylperoxycyclohexyl)propane, t-butylcumylperoxide, di-t-butylperoxide, t-butylhydroperoxide, 2,2-di(t-butylperoxy)butane, 2,5-dimethyl-2,5-di(benzylperoxy)hexane, 2,5-dimethyl-2,5-di(2-ethylhydroxyperoxy) hexane, 1,1-di(t-butylperoxy)cyclohexane, 1,1-di(t-hexylperoxy)cyclohexane, n-butyl 4,4-di(t-butylperoxy)valerate, di-t-hexylperoxide, t-hexylperoxyisobutylmonocarbonate, t-hexylperoxyneodacanoate, t-hexylperoxy-2-ethylhexanoate, t-hexylperoxypivalate, t-hexylperoxybenzoate, and a mixture thereof.

Among them, more preferable examples of the peroxide include p-menthane hydroperoxide, benzoyl peroxide, dilauroyl peroxide, di(3,5,5-trimethylhexanoyl)peroxide, disuccinic acid peroxide, t-butyl peroxyisopropylmonocarbonate, t-butylperoxy-2-ethylhexanoate, t-butylperoxypivalate, t-butylperoxybenzoate, t-butylperoxy-3-methylbenzoate, t-butylperoxy-2-ethylhexylmonocabonate, t-butylperoxy-3,5,5-trimethylhexanoate, t-butylperoxylaurate, t-butylperoxyacetate, 2,5-dimethyl-2,5-di(t-butylperoxy)hexane, benzoyl m-methylbenzoylperoxyde, m-toluyl peroxide, 1,1,3,3-tetramethylbutylhydroperoxy-2-ehtylhexanoate, 2,2-bis(4,4-di-t-butylperoxycyclohexyl)propane, t-butylcumylperoxide, di-t-butylperoxide, 2,2-di(t-butylperoxy)butane, 2,5-dimethyl-2,5-di(benzylperoxy)hexane, 2,5-dimethyl-2,5-di(2-ethylhydroxyperoxy)hexane, 1,1-di(t-butylperoxy)cyclohexane, 1,1-di(t-hexylperoxy) cyclohexane, n-butyl4,4-di(t-butylperoxy)valerate, di-t-hexylperoxide, t-hexylperoxyisobutylmonocarbonate, t-hexylperoxyneodecanoate, t-hexylperoxy-2-ethylhexanoate, t-hexylperoxypivalate, and t-hexylperoxybenzoate.

A metal catalyst such as cobalt naphthenate may coexist at the time of reaction.

A reaction temperature is not particularly limited but is preferably a temperature at which the starting material polyphenylene ether and the polyfunctional phenol compound dissolve and at which an initiator can generate a radical at the time of reaction. A rough indication of the reaction temperature is preferably within a range of ±20° C. from the 1-hour half-life temperature of the radical initiator used. Stirring may continue under predetermined heating conditions after adding the radical initiator to maintain reaction for the purpose of completing reaction.

Examples of a method of adding the radical initiator include a method of adding the whole amount of the radical initiator at the time of initiating reaction; a method of adding the radical initiator in several divisions during reaction; a method of continuously or intermittently adding the radical initiator from the beginning of reaction; a method of reacting the radical initiator with the whole amount or a part of the polyfunctional phenol compound in advance and adding it to the reaction system including the starting material polyphenylene ether or including the starting material polyphenylene ether and the polyfunctional phenol compound; and a method of reacting the radical initiator with the whole amount or a part of the starting material polyphenylene ether in advance and adding it to the reaction system including the polyfunctional phenol compound or including the starting material polyphenylene ether and the polyfunctional phenol compound.

These methods of adding the radical initiator can be appropriately selected according to a target A-type polyphenylene ether, characteristics of the radical initiator, and a purpose such as control of reaction conditions.

A reaction time can be 0.5 to 6 hours, for example. The reaction time is not limited thereto and can be appropriately adjusted according to a reaction temperature, a substrate, and concentrations of starting materials.

A method of recovering the H-type polyphenylene ether from a solution including the H-type polyphenylene ether after reaction (hereinafter, also referred to as the "polymer solution") is not particularly limited. Examples thereof include a method of adding the polymer solution into a poor solvent such as an alcohol, precipitating the H-type polyphenylene ether through reprecipitation, and subsequently separating the H-type polyphenylene ether from the solvent followed by drying. Examples of the poor solvent which can be used for reprecipitation include methanol, ethanol, 1-propanol, 2-propanol, 1-butanol, 2-butanol, 2-methyl-1-propanol, 2-methyl-2-propanol, and n-hexane and preferably include methanol, ethanol, 1-propanol, 2-propanol, 1-butanol, 2-butanol, 2-methyl-1-propanol, and 2-methyl-2-propanol.

Examples of another method include a method of distilling the solvent away under a reduced pressure after reaction. In this case, a radical stabilizer such as a polymerization inhibitor may be added before distilling the solvent away as needed.

The polymer solution can also be washed before recovering the H-type polyphenylene ether for the purpose of removing a compound derived from the initiator and reaction by-products in the polymer solution. Water or a water/alcohol mixed solvent system can be preferably used for washing the polymer solution. An alkali such as sodium hydroxide, sodium carbonate, sodium hydrogen carbonate, potassium hydroxide, potassium carbonate, and potassium hydrogen carbonate may be added to the washing solvent as needed.

Similarly, when an unreacted starting material polyphenylene ether is remained, a by-product insoluble in the solvent, and the like are generated after reaction, the above operation may be conducted after conducting operation such as filtration as needed.

The H-type polyphenylene ether obtained can be identified by NMR, IR, GPC, and the like.

The polyphenylene ether represented by formula (1b) or formula (1d) can be obtained by introducing the substituent represented by A into a terminal of the H-type polyphenylene ether obtained as described above. A method for introducing the substituent represented by A (for example, the functional groups represented by formulae (4) to (7)) into a terminal of the obtained H-type polyphenylene ether is not particularly limited, and various known methods can be used according to types of functional groups.

The functional group represented by formula (4), (6), or (7) can be generally introduced into a terminal of the H-type polyphenylene ether through formation of an ether bond by Williamson synthesis method, for example. Specifically, a hydroxy group at a terminal of the H-type polyphenylene ether is substituted to form an alkali metal salt by using a base or the like, and an alkyl halide terminal is subsequently reacted therewith. Substitution of a hydroxy group to form an alkali metal salt can be achieved by reacting a terminal hydroxy group of the H-type polyphenylene ether with an alkali metal, an alkali metal hydride, an alkali metal amide, an alkali metal hydroxide, or the like, for example.

A solvent which is inactive to reaction and which can dissolve the H-type polyphenylene ether is generally selected as the solvent used for reaction. In addition, when an alkali metal hydroxide and the like are used in synthesizing the alkali metal salt, reaction may be carried out in a two-phase system including an organic phase in which the H-type polyphenylene ether is dissolved and an aqueous phase in which the alkali metal hydroxide or the like is dissolved, for example. When such a reaction system is used, a salt such as a quaternary amine salt may be allowed to coexist and used as a phase transfer catalyst at the time of reaction as needed. After the reaction, washing may be conducted using water or an acidic or alkaline aqueous solution so as to remove an alkali salt by-product, an amine salt used for reaction, and the like, or the polymer solution may be dropped into a poor solvent such as alcohols to recover a target substance through reprecipitation. The solvent may be distilled away under a reduced pressure after washing the polymer solution to recover the polymer.

In the case of the functional group represented by formula (6), an ester bond may be formed according to the following method after introducing a hydroxyalkyl group into a terminal of the H-type polyphenylene ether in advance according to the above-described method.

The functional group represented by formula (5) can be introduced by forming an ester bond between a hydroxy group at a terminal of the H-type polyphenylene ether and a carboxyl group in a carboxylic acid having a carbon-carbon double bond (hereinafter, also simply referred to as an "unsaturated carboxylic acid"). Known various methods can be used as a method for forming an ester bond. Examples thereof include method a: reaction between an unsaturated carboxylic acid halide and the hydroxy group at a polymer terminal; method b: formation of an ester bond through reaction with an unsaturated carboxylic acid anhydride; method c: direct reaction with an unsaturated carboxylic acid; and method d: a method using transesterification reaction.

Method a: reaction with an unsaturated carboxylic acid halide is one of the most common methods. A chloride and a bromide are generally used as the carboxylic acid halide, but another halogen may be used. The reaction may be any of direct reaction with a hydroxy group and reaction with an alkali metal salt formed by substitution of a hydroxy group. As an acid such as a hydrogen halide is generated in direct reaction between an unsaturated carboxylic acid halide and a hydroxy group, a weak base such as an amine may be allowed to coexist in the reaction system for the purpose of trapping the acid generated.

In method b: reaction with an unsaturated carboxylic acid anhydride and method c: direct reaction with an unsaturated carboxylic acid, a compound such as carbodiimides and dimethylaminopyridine, for example, may be allowed to coexist in the reaction system in order to activate a reaction point and promote esterification reaction.

In the case of method d: transesterification reaction, generated alcohols are desirably removed as needed. Known metal catalysts may be allowed to coexist so as to promote transesterification reaction. A method similar to the method conducted in ether synthesis reaction can be used for removing by-products after reaction.

The A-type polyphenylene ether obtained as described above can be identified by NMR, IR, GPC, and the like.

The polyphenylene ether of the present embodiment has low dielectric characteristics and is excellent in heat resistance, and therefore, preferably used as a material for various electrical and electronic uses. Especially, the polyphenylene ether of the present embodiment has good flowability and moldability at the same time, and therefore, preferably used in manufacturing prepregs for electrical and electronic parts (a printed wiring board base material and the like)

Although the reason why the polyphenylene ether of the present embodiment has good flowability as described above is not exactly known, it is presumed that by virtue of having a partial structure of the polyfunctional phenol compound within a molecular and further having a bulky moiety as the partial structure of the polyfunctional phenol compound as in the polyphenylene ether of the present embodiment, packing of polyphenylene ether molecules is prevented, and intermolecular interaction is weakened, which contributes to good flowability.

[Polyphenylene Ether Composition]

The polyphenylene ether of the present embodiment may be solely used as thermoplastic resin, may be used in combination with a polyphenylene ether having another structure as a composition, or may be used in combination with variety of known additives as a composition. In such cases, a content of the polyphenylene ether of the present embodiment in a polyphenylene ether composition can be 0.5% to 95% by mass, for example.

The polyphenylene ether of the present embodiment can be also used as a curing agent composition in combination with a polyfunctional curing agent, a curing accelerator, epoxy resin, a compound having a polymerizable unsaturated group, and the like, which may react with the polyphenylene ether, as needed. A content of the polyphenylene ether in such a curing agent composition is not limited but can be 0.5% to 95% by mass, for example. Other known additives such as a flame retardant, elastomer, and inorganic filler, and the like can be also added to the curing agent composition.

Since the polyphenylene ether of the present embodiment has high curing reactivity, a cured product with high heat resistance can be obtained.

EXAMPLES

Hereinafter, the present embodiment will be described in detail with reference to examples, but the present embodiment is not limited to the following examples at all.

(Synthesis Reaction of Polyphenylene Ether) Commercially available reagents were directly used as solvents used for reaction. Starting materials and reagents used were as follows.

1. Solvent

Toluene: a special grade reagent manufactured by FUJIFILM Wako Pure Chemical Corporation was directly used.

Methyl isobutyl ketone: the special grade reagent manufactured by FUJIFILM Wako Pure Chemical Corporation was directly used.

Methyl ethyl ketone: the special grade reagent manufactured by FUJIFILM Wako Pure Chemical Corporation was directly used.

Methanol: the special grade reagent manufactured by FUJIFILM Wako Pure Chemical Corporation was directly used.

Isopropanol: the special grade reagent manufactured by FUJIFILM Wako Pure Chemical Corporation was directly used.

Ethanol: the special grade reagent manufactured by FUJIFILM Wako Pure Chemical Corporation was directly used.

2. Initiator:

NYPER BMT: a product available from NOF CORPORATION was directly used.

3. Starting Material Polyphenylene Ether

S202A (number-average molecular weight in terms of polystyrene: 16000): a product manufactured by Asahi Kasei Corp. was directly used.

S203A (number-average molecular weight in terms of polystyrene: 10000): a product manufactured by Asahi Kasei Corp. was directly used.

Both of S202A and S203A have the following structure.

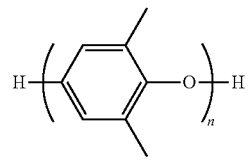

4. Starting Material Phenol (Polyfunctional/Bifunctional Phenol)

4-1. A-Valent Phenols (a=3 to 6) Including Group Represented by Formula (2)

1,1,3-Tris(2-methyl-4-hydroxy-5-tert-butylphenol)butane: a product available from ADEKA Corporation (ADK STAB AO-30) was directly used.

2,4,6-Tris(3',5'-di-tert-butyl-4'-hydroxybenzyl)mesitylene: a product available from ADEKA Corporation (ADK STAB AO-330) was directly used.

Pentaerythritoltetrakis[3-(3,5-di-tert-butyl-4-hydroxyphenyl)propionate]: a product available from ADEKA Corporation (ADK STAB AO-60) was directly used.

1,3,5-Tris[[3,5-bis(1,1-dimethylethyl)-4-hydroxyphenyl]methyl]-1,3,5-triazine-2,4,6-(1H,3H,5H)-trione: a product available from ADEKA Corporation (ADK STAB AO-20) was directly used.

4-2. Trivalent Phenols Including No Group Represented by Formula (2)

Tris(4-hydroxyphenyl)ethane: a product available from ASAHI YUKIZAI CORPORATION was directly used.

4-3. Divalent Phenols Including No Group Represented by Formula (2)

Bisphenol A: a reagent available from Sigma-Aldrich Co. LLC. was directly used.

5. Modifying Group Starting Material

Methacrylic anhydride: a reagent available from Sigma-Aldrich Co. LLC. was directly used.

Dimethylaminopyridine: a reagent available from Sigma-Aldrich Co. LLC. was directly used.

Methacryloyl chloride: a reagent available from Sigma-Aldrich Co. LLC. was directly used.

Triethylamine: a reagent available from Sigma-Aldrich Co. LLC. was directly used.

Chloromethylstyrene (ratio between p-chloromethylstyrene and m-chloromethylstyrene was 50/50): a product available from Tokyo Chemical Industry Co., Ltd. was directly used.

Tetra-n-butylammonium bromide: a reagent available from Sigma-Aldrich Co. LLC. was directly used.

Allyl bromide: a reagent available from Sigma-Aldrich Co. LLC. was directly used.

(Identification and Analysis of Polyphenylene Ether)

1. Number-Average Molecular Weight Measurement

Molecular weights were measured by using GPC with chloroform solvent. Molecular weights were calculated by a polystyrene conversion method based on a calibration curve using standard polystyrene.

2. 1H-NMR Measurement

A sample was dissolved in deuterated chloroform so that the concentration of the sample became 5% by mass, and 1H-NMR measurement was carried out. Progression of reaction was confirmed by confirming reduction of a peak originating from a hydroxy group based on a ratio between a peak originating from an aromatic group of a polyfunctional phenol unit and a peak originating from a hydroxy group.

3. Solution Viscosity Measurement

To a beaker was added 200 mL of a 20 mass % methyl ethyl ketone solution of each sample, and viscosity was measured at 25° C. using a B-type rotational viscometer with a rotating speed of 30 rpm. Further, viscosity was measured at 25° C. using a cone-plate viscometer with 1.1 mL of a 50 mass % toluene solution.

Example 1

Synthesis of Polyphenylene Ether 1

A Dimroth pressure equalizing dropping funnel equipped with a three-way cock was installed to a 500-mL three neck flask. After the inside of the flask was replaced with nitrogen, 100 g of starting material polyphenylene ether S202A, 200 g of toluene, and 12.8 g of 1,1,3-tris(2-meethyl-4-hydroxy-5-tert-butylphenyl)butane as a polyfunctional phenol were added thereto. A thermometer was installed to the flask, and the flask was heated to 90° C. by an oil bath while stirring with a magnetic stirrer to dissolve the starting material polyphenylene ether. As an initiator, 37.5 g of a 40% meta-xylene solution of a mixture of benzoyl peroxide, benzoyl m-methylbenzoyl peroxide, and m-toluyl peroxide (NYPER BMT: manufactured by NOF CORPORATION) was diluted in 87.5 g of toluene, and the pressure equalizing dropping funnel was charged therewith. The temperature inside the flask was decreased to 80° C., and dropping of the initiator solution into the flask was subsequently started to initiate reaction. The initiator was dropped over two hours, the temperature inside the flask was increased again to 90° C. after dropping, and stirring was continued for four hours. After reaction, the polymer solution was dropped into methanol to reprecipitate a polymer, and the polymer was subsequently filtered out from the solution and recovered. Thereafter, the recovered polymer was dried at 100° C. under vacuum for three hours. It was confirmed by 1H-NMR that the low-molecular weight phenol was incorporated into the polymer, and the peak originating from a hydroxy group disappeared. From this 1H-NMR measurement result, the obtained polymer was confirmed to be a polyphenylene ether having the following structure.

a cone-plate viscometer was 159 mPa·s. In the above formula, l, m, and n each represent the number of repetitions which can be estimated from the molecular weight and the structural formula.

Example 2

Synthesis of Polyphenylene Ether 1'

Into a 1.5-L reactor with a jacket were added 0.10 g of copper(II) chloride dihydrate, 0.59 g of 35% hydrochloric acid, 3.05 g of N,N,N',N'-tetramethylpropanediamine, 215.0 g of n-butanol and 501.0 g of methanol, 132.7 g of 2,6-dimethylphenol, and 47.3 g of 1,1,3-tris(2-methyl-4-hydroxy-5-tert-butylphenyl)butane, with the bottom part of the reactor being provided with a sparger for introducing oxygen-containing gas, a stirring turbine blade, and a baffle, and a vent gas line at the upper part of the reactor being provided with a reflux condenser. The composition ratio by weight of the solvents used was n-butanol:methanol=30:70. Then, introduction of oxygen into the reactor from the sparger was started at a speed of 120 mL/min while vigorously stirring, and the polymerization temperature was simultaneously adjusted by allowing a heat medium to pass through the jacket so as to keep 45° C. The polymerization liquid gradually came to have a form of slurry.

Ventilation of oxygen-containing gas was stopped 190 minutes after the introduction of oxygen was started, a 50% aqueous solution in which 0.52 g of ethylenediamine tetraacetic acid tripotassium salt (reagent manufactured by DOJINDO LABORATORIES) was dissolved was added to this polymerization mixture, and reaction was conducted at 60° C. for three hours. After the completion of reaction, filtration was performed and washing was performed three times with a washing liquid (b), the amount of which was set so that a mass ratio (b/a) of the methanol washing liquid (b) to the amount of the polyphenylene ether (a) to be washed was 4, to obtain a wet polyphenylene ether. Thereafter, vacuum drying was performed at 120° C. for one hour to obtain a dried polyphenylene ether. It was confirmed by 1H-NMR that the low-molecular weight phenol was incor-

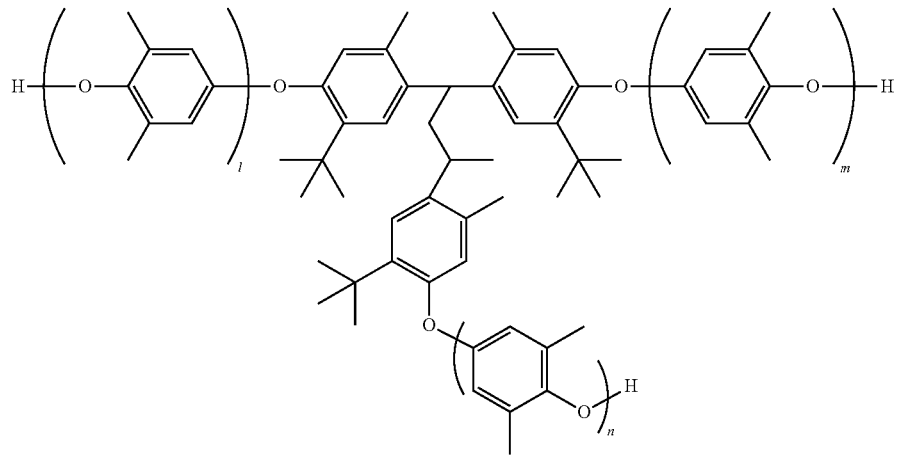

As a result of GPC measurement, the molecular weight was Mn=1500 in terms of polystyrene. The solution viscosity in 20% methyl ethyl ketone solvent was 125 cPois. The solution viscosity of the 50% toluene solution measured by porated into the polymer, and the peak originating from a hydroxy group disappeared. From this 1H-NMR measurement result, the obtained polymer was confirmed to be a polyphenylene ether having the following structure.

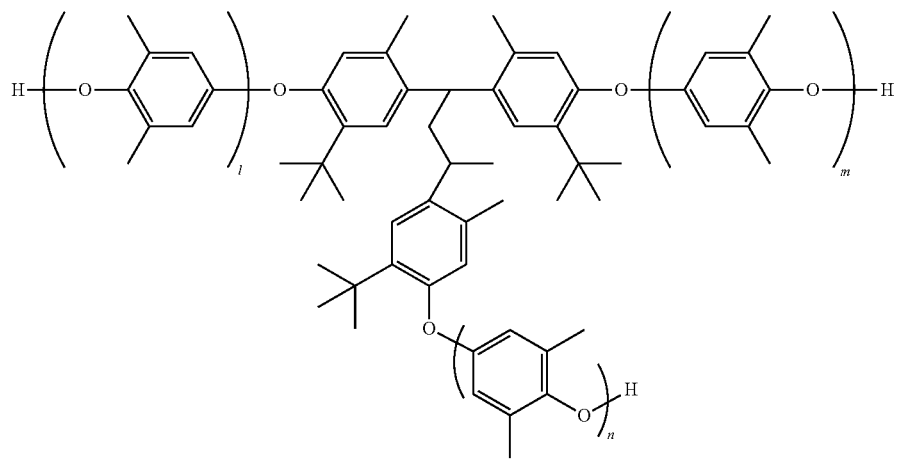

As a result of GPC measurement, the molecular weight was Mn=1500 in terms of polystyrene. The solution viscosity in 20% methyl ethyl ketone solvent was 125 cPois. The solution viscosity of the 50% toluene solution measured by a cone-plate viscometer was 158 mPa·s. In the above formula, l, m, and n each represent the number of repetitions which can be estimated from the molecular weight and the structural formula.

Example 3

Synthesis of Polyphenylene Ether 2

Reaction was conducted in the same manner as in Example 1 except that 18.1 g of 2,4,6-tris(3',5'-di-tert-butyl-4'-hydroxybenzyl)mesitylene was used as a polyfunctional phenol instead of 1,1,3-tris(2-methyl-4-hydroxy-5-tert-butylphenyl)butane. It was confirmed by 1H-NMR that the polyfunctional phenol was incorporated into the polymer, and the peak originating from a hydroxy group disappeared. From this result, the obtained polymer was confirmed to be a polyphenylene ether having the following structure.

As a result of GPC measurement, the molecular weight was Mn=1600 in terms of polystyrene. The solution viscosity in 20% methyl ethyl ketone solvent was 127 cPois. The solution viscosity of the 50% toluene solution measured by a cone-plate viscometer was 187 mPa·s. In the following formula, l, m, and n each represent the number of repetitions which can be estimated from the molecular weight and the structural formula.

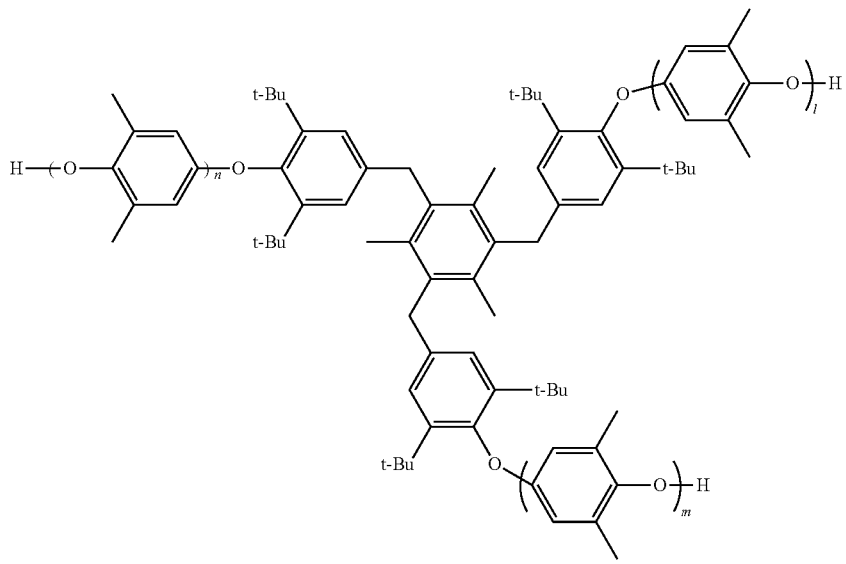

Example 4

Synthesis of Polyphenylene Ether 3

Reaction was conducted in the same manner as in Example 1 except that 20.7 g of pentaerythritoltetrakis[3-(3,5-di-tert-butyl-4-hydroxyphenyl)propionate] was used as a polyfunctional phenol instead of 1,1,3-tris(2-methyl-4-hydroxy-5-tert-butylphenyl)butane. It was confirmed by 1H-NMR that the polyfunctional phenol was incorporated into the polymer, and the peak originating from a hydroxy group disappeared. From this result, the obtained polymer was confirmed to be a polyphenylene ether having the following structure.

As a result of GPC measurement, the molecular weight was Mn=2000 in terms of polystyrene. The solution viscosity in 20% methyl ethyl ketone solvent was 130 cPois. The solution viscosity of the 50% toluene solution measured by a cone-plate viscometer was 180 mPa·s. In the following formula, k, l, m, and n each represent the number of repetitions which can be estimated from the molecular weight and the structural formula.

Example 5

Synthesis of Polyphenylene Ether 4

Reaction was conducted in the same manner as in Example 1 except that 18.3 g of 1,3,5-tris[[3,5-bis(1,1-dimethylethyl)-4-hydroxyphenyl]methyl]-1,3,5-triazine-2,4,6(1H,3H,5H)-trione was used as a polyfunctional phenol instead of 1,1,3-tris(2-methyl-4-hydroxy-5-tert-butylphenyl)butane. It was confirmed by 1H-NMR that the polyfunctional phenol was incorporated into the polymer and the peak originating from a hydroxy group disappeared. From this result, the obtained polymer was confirmed to be a polyphenylene ether having the following structure.

As a result of GPC measurement, the molecular weight was Mn=1800 in terms of polystyrene. The solution viscosity in 20% methyl ethyl ketone solvent was 128 cPois. The solution viscosity of the 50% toluene solution measured by a cone-plate viscometer was 175 mPa·s. In the following formula, l, m, and n each represent the number of repetitions which can be estimated from the molecular weight and the structural formula.

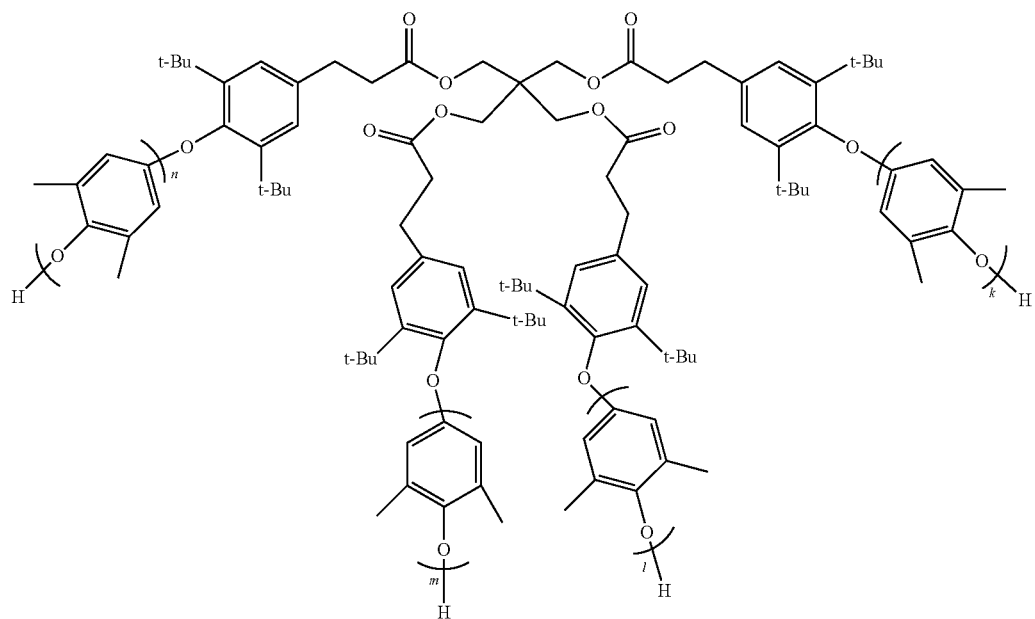

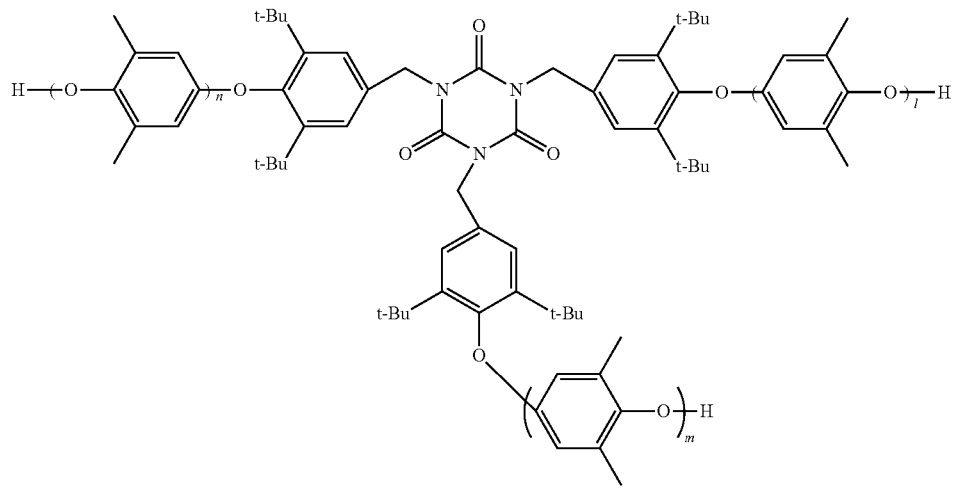

Comparative Example 1

Synthesis of Polyphenylene Ether 5

Synthesis was conducted in the same manner as in Example 1 except that 8.0 g of bisphenol A was used instead of the polyfunctional phenol. It was confirmed by 1H-NMR that the polyfunctional phenol was incorporated into the polymer and the peak originating from a hydroxy group disappeared.

As a result of GPC measurement, the molecular weight was Mn=1800 in terms of polystyrene. The solution viscosity in 20% methyl ethyl ketone solvent was 254 cPois, and the solution viscosity was higher than those in the cases using polyfunctional phenols. The solution viscosity of the 50% toluene solution measured by a cone-plate viscometer was 280 mPa·s, and the solution viscosity was higher than those in the cases using polyfunctional phenols.

Comparative Example 2

Reaction was conducted in the same manner as in Example 1 except that 7.2 g of 1,1,1-tris(4-hydroxyphenyl)ethane was used as a polyfunctional phenol instead of 1,1,3-tris(2-methyl-4-hydroxy-5-tert-butylphenyl)butane. However, the polyfunctional phenol did not dissolve, and an unreacted low molecular weight phenol remained even after reaction.

The solution viscosity of the obtained compound in 20% methyl ethyl ketone solvent was 254 cPois, and the solution viscosity was higher than those in the cases using polyfunctional phenols each having the group represented by formula (2). The solution viscosity of the 50% toluene solution measured by a cone-plate viscometer was 392 mPa·s, and the solution viscosity was higher than those in the cases using polyfunctional phenols each having the group represented by formula (2).

Example 6

Synthesis of Polyphenylene Ether 6

Reaction was conducted in the same manner as in Example 1 except that 100 g of S203A was used as a starting material polyphenylene ether. It was confirmed by 1H-NMR that the polyfunctional phenol was incorporated into the polymer and the peak originating from a hydroxy group disappeared. From this result, the obtained polymer was confirmed to be a polyphenylene ether having the same structure as the structure described in Example 1.

As a result of GPC measurement, the molecular weight was Mn=1500 in terms of polystyrene. The solution viscosity in 20% methyl ethyl ketone solvent was 138 cPois. The solution viscosity of the 50% toluene solution measured by a cone-plate viscometer was 170 mPa·s.

Example 7

Synthesis of Polyphenylene Ether 7

Eighty grams of toluene and 26 g of synthesized polyphenylene ether 1 were mixed and heated to about 85° C., and 0.55 g of dimethylaminopyridine was added thereto. At the time when solids were assumed to completely dissolve, 4.9 g of methacrylic anhydride was gradually added. The obtained solution was kept at 85° C. for three hours while continuously mixing it. Thereafter, the solution was cooled to room temperature to obtain a toluene solution of a methacrylate-modified polyphenylene ether.

A part of the solution was taken and dried, and 1H-NMR measurement was subsequently conducted thereon. As the peak originating from a hydroxy group of the polyphenylene ether disappeared, reaction was considered to proceed, and purification operation was performed in turn. Into 360 g of methanol vigorously stirred with a magnetic stirrer in a one-liter beaker, 120 g of a toluene solution of the above methacrylate-modified polyphenylene ether was dropped over 30 minutes. The obtained precipitate was filtered under a reduced pressure with a membrane filter followed by drying to obtain 38 g of a polymer.

The 1H-NMR measurement result of the dried polymer is shown in FIG. 1. Disappearance of the peak originating from a hydroxy group of the polyphenylene ether positioned around 4.5 ppm and appearance of a peak originating from olefin of the methacryl group around 5.75 ppm were confirmed. As the peaks originating from dimethylaminopyridine, methacrylic anhydride, and methacrylic acid almost disappeared in GC measurement, the peak originating from olefin in NMR was considered as a peak of the methacryl group bonded to a polyphenylene ether terminal. From this result, the obtained polymer was confirmed to be a modified polyphenylene ether having the following structure.

As a result of GPC measurement, the molecular weight was Mn=1600 in terms of polystyrene. The solution viscosity in 20% methyl ethyl ketone solvent was 131 cPois. The solution viscosity of the 50% toluene solution measured by a cone-plate viscometer was 140 mPa·s. In the following formula, l, m, and n each represent the number of repetitions which can be estimated from the molecular weight and the structural formula.

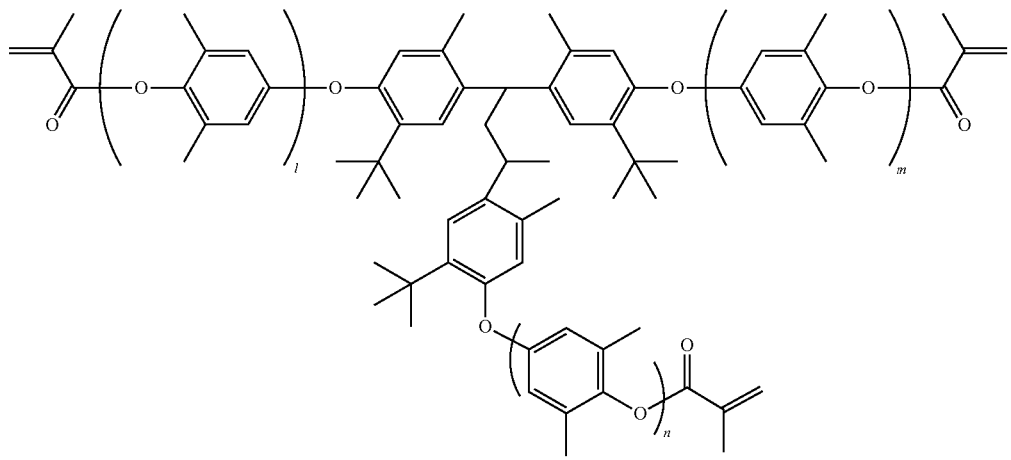

Example 8

Synthesis of Polyphenylene Ether 8

Synthesis was conducted in the same manner as in Example 7 except that 26 g of polyphenylene ether 1' was used instead of polyphenylene ether 1. 1H-NMR measurement was conducted to confirm disappearance of the peak originating from a hydroxy group of the polyphenylene ether and appearance of a peak originating from olefin of the methacryl group. As the peaks originating from dimethylaminopyridine, methacrylic anhydride, and methacrylic acid almost disappeared in GC measurement, the peak originating from olefin in NMR was considered as a peak of the methacryl group bonded to a polyphenylene ether terminal. From this result, the obtained polymer was confirmed to be a modified polyphenylene ether having the following structure.

As a result of GPC measurement, the molecular weight was Mn=1600 in terms of polystyrene. The solution viscosity in 20% methyl ethyl ketone solvent was 131 cPois. The solution viscosity of the 50% toluene solution measured by a cone-plate viscometer was 142 mPa·s. In the following formula, l, m, and n each represent the number of repetitions which can be estimated from the molecular weight and the structural formula.

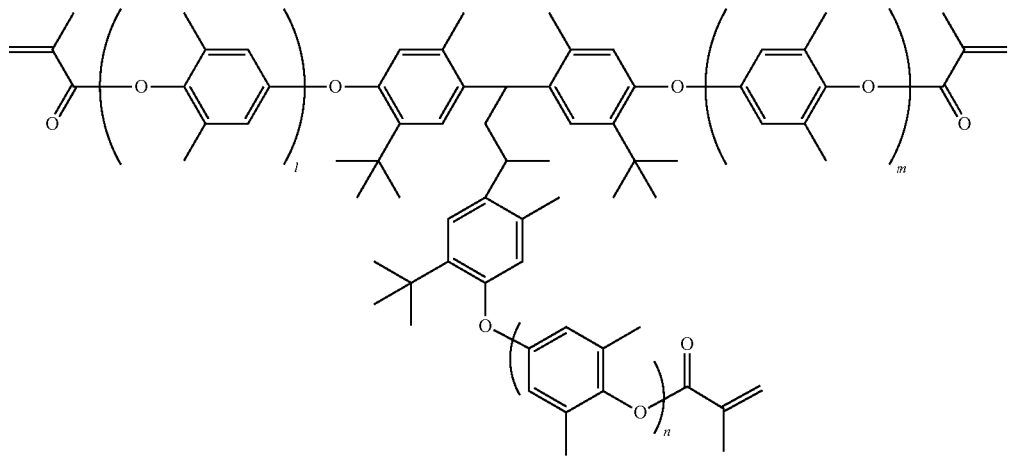

Example 9

Synthesis of Polyphenylene Ether 9

Synthesis was conducted in the same manner as in Example 7 except that 25 g of polyphenylene ether 2 was used instead of polyphenylene ether 1. 1H-NMR measurement was conducted to confirm disappearance of the peak originating from a hydroxy group of the polyphenylene ether and appearance of a peak originating from olefin of the methacryl group. As the peaks originating from dimethylaminopyridine, methacrylic anhydride, and methacrylic acid almost disappeared in GC measurement, the peak originating from olefin in NMR was considered as a peak of the methacryl group bonded to a polyphenylene ether terminal. From this result, the obtained polymer was confirmed to be a modified polyphenylene ether having the following structure.

As a result of GPC measurement, the molecular weight was Mn=1720 in terms of polystyrene. The solution viscosity in 20% methyl ethyl ketone solvent was 132 cPois. The solution viscosity of the 50% toluene solution measured by a cone-plate viscometer was 149 mPa·s. In the following formula, l, m, and n each represent the number of repetitions which can be estimated from the molecular weight and the structural formula.

Example 10

Synthesis of Polyphenylene Ether 10

Synthesis was conducted in the same manner as in Example 7 except that 20 g of polyphenylene ether 3 was used instead of polyphenylene ether 1. 1H-NMR measurement was conducted to confirm disappearance of the peak originating from a hydroxy group of the polyphenylene ether and appearance of a peak originating from olefin of the methacryl group. As the peaks originating from dimethylaminopyridine, methacrylic anhydride, and methacrylic acid almost disappeared in GC measurement, the peak originating from olefin in NMR was considered as a peak of the methacryl group bonded to a polyphenylene ether terminal. From this result, the obtained polymer was confirmed to be a modified polyphenylene ether having the following structure.

As a result of GPC measurement, the molecular weight was Mn=2100 in terms of polystyrene. The solution viscosity in 20% methyl ethyl ketone solvent was 135 cPois. The solution viscosity of the 50% toluene solution measured by a cone-plate viscometer was 150 mPa·s. In the following formula, k, l, m, and n each represent the number of repetitions which can be estimated from the molecular weight and the structural formula.

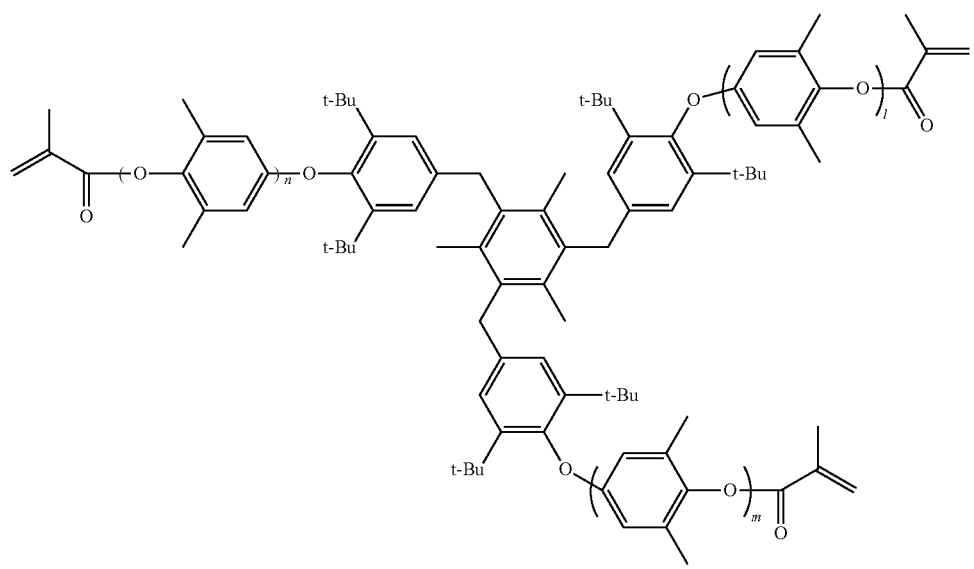

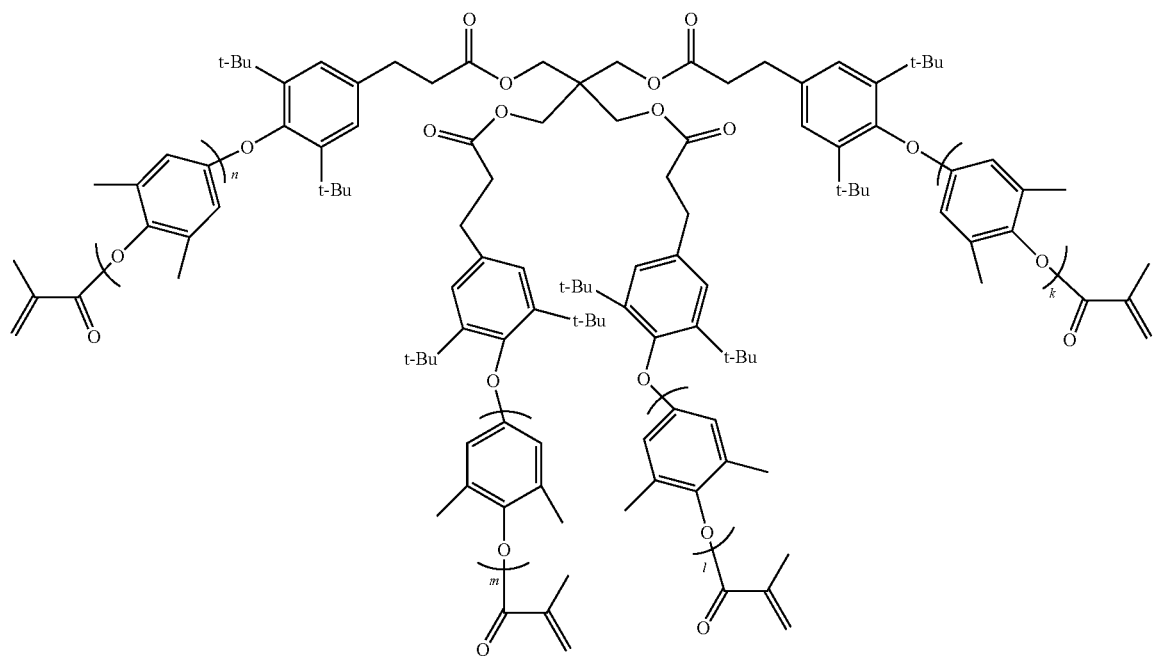

Example 11

Synthesis of Polyphenylene Ether 11

Synthesis was conducted in the same manner as in Example 7 except that 25 g of polyphenylene ether 4 was used instead of polyphenylene ether 1. 1H-NMR measurement was conducted to confirm disappearance of the peak originating from a hydroxy group of the polyphenylene ether and appearance of a peak originating from olefin of the methacryl group. As the peaks originating from dimethylaminopyridine, methacrylic anhydride, and methacrylic acid almost disappeared in GC measurement, the peak originating from olefin in NMR was considered as a peak of the methacryl group bonded to a polyphenylene ether terminal. From this result, the obtained polymer was confirmed to be a modified polyphenylene ether having the following structure.

As a result of GPC measurement, the molecular weight was Mn=1900 in terms of polystyrene. The solution viscosity in 20% methyl ethyl ketone solvent was 135 cPois. The solution viscosity of the 50% toluene solution measured by a cone-plate viscometer was 149 mPa·s. In the following formula, l, m, and n each represent the number of repetitions which can be estimated from the molecular weight and the structural formula.

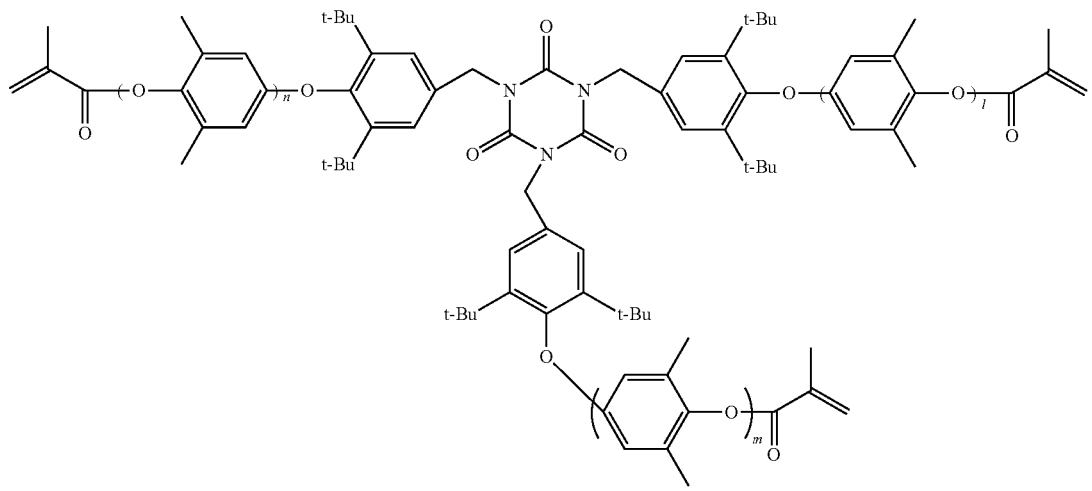

Example 12

Synthesis of Polyphenylene Ether 12

Eighty grams of toluene and 26 g of polyphenylene ether 1 were mixed. Four grams of triethylamine was added thereto, and at the time when solids were assumed to completely dissolve, 3.9 g of methacryloyl chloride was gradually added. The obtained solution was kept at 85° C. for three hours while continuously mixing it. Thereafter, the solution was cooled to room temperature to obtain a toluene solution of a methacrylate-modified polyphenylene ether. After the toluene solution was washed with 120 g of water, purification was performed in the same manner as in Example 7. 1H-NMR measurement was conducted to confirm disappearance of the peak originating from a hydroxy group of the polyphenylene ether and appearance of a peak originating from olefin of the methacryl group. As the peaks originating from methacrylic acid almost disappeared in GC measurement, the peak originating from olefin in NMR was considered as a peak of the methacryl group bonded to a polyphenylene ether terminal. From this result, the obtained polymer was confirmed to be the same as the modified polyphenylene ether obtained in Example 7.

As a result of GPC measurement, the molecular weight was Mn=1600 in terms of polystyrene. The solution viscosity in 20% methyl ethyl ketone solvent was 130 cPois. The solution viscosity of the 50% toluene solution measured by a cone-plate viscometer was 140 mPa·s.

group of the polyphenylene ether and appearance of a peak originating from olefin of styryl group. As peaks originating from chloromethystyrenes almost disappeared in GC measurement, the peak originating from olefin in NMR was considered as a peak of the styryl group bonded to a polyphenylene ether terminal. From this result, the obtained polymer was confirmed to be a modified polyphenylene ether having the following structure.

As a result of GPC measurement, the molecular weight was Mn=1590 in terms of polystyrene. The solution viscosity in 20% methyl ethyl ketone solvent was 130 cPois. The solution viscosity of the 50% toluene solution measured by a cone-plate viscometer was 144 mPa·s. In the following formula, l, m, and n each represent the number of repetitions which can be estimated from the molecular weight and the structural formula.

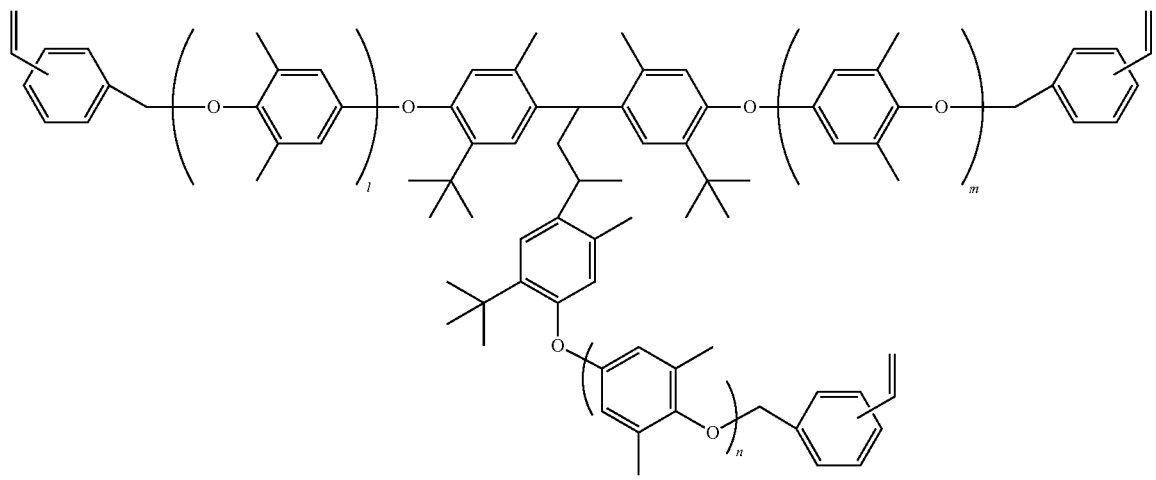

Example 13

Synthesis of Polyphenylene Ether 13

To a 300-mL three neck flask provided with a temperature controller, a stirring device, cooling equipment, and a dropping funnel were added 26 g of polyphenylene ether 1 synthesized in Example 1, 4.4 g of chloromethylstyrene (manufactured by Tokyo Chemical Industry Co., Ltd., ratio between p-chloromethylstyrene and m-chloromethylstyrene was 50/50), 0.2 g of tetra-n-butylammonium bromide, and 80 g of toluene. The mixture was stirred and dissolved, and the temperature of the liquid was set to 75° C. A sodium hydroxide aqueous solution (sodium hydroxide 2.2 g/water 3 g) was dropped into the mixed liquid over 20 minutes, and the mixed liquid was continuously stirred at 75° C. for four hours. Thereafter, contents of the flask were neutralized with 10% hydrochloric acid aqueous solution, and 120 g of the polymer solution was subsequently dropped into 360 g of methanol over 30 minutes, with the methanol being vigorously stirred with a magnetic stirrer in a one-liter beaker. The obtained precipitate was filtered under a reduced pressure with a membrane filter followed by drying to obtain 39 g of a polymer. 1H-NMR measurement was conducted to confirm disappearance of the peak originating from a hydroxy

Example 14

Synthesis of Polyphenylene Ether 14

Synthesis was conducted in the same manner as in Example 7 except that 26 g of polyphenylene ether 6 was used instead of polyphenylene ether 1. 1H-NMR measurement was conducted to confirm disappearance of the peak originating from a hydroxy group of the polyphenylene ether and appearance of a peak originating from olefin of the methacryl group. As the peaks originating from dimethylaminopyridine, methacrylic anhydride, and methacrylic acid almost disappeared in GC measurement, the peak originating from olefin in NMR was considered as a peak of the methacryl group bonded to a polyphenylene ether terminal. From this result, the obtained polymer was confirmed to be the same as the modified polyphenylene ether obtained in Example 7.

As a result of GPC measurement, the molecular weight was Mn=1600 in terms of polystyrene. The solution viscosity in 20% methyl ethyl ketone solvent was 130 cPois. The solution viscosity of the 50% toluene solution measured by a cone-plate viscometer was 140 mPa·s.

Comparative Example 3

Synthesis was conducted in the same manner as in Example 7 except that polyphenylene ether 5 synthesized in Comparative Example 1 was used. 1H-NMR measurement was conducted to confirm disappearance of the peak originating from a hydroxy group of the polyphenylene ether and appearance of a peak originating from olefin of the methacryl group. As the peaks originating from dimethylaminopyridine, methacrylic anhydride, and methacrylic acid almost disappeared in GC measurement, the peak originating from olefin in NMR was considered as a peak of olefin bonded to a polyphenylene ether terminal.

As a result of GPC measurement, the molecular weight was Mn=1900 in terms of polystyrene. The solution viscosity in 20% methyl ethyl ketone solvent was 290 cPois, and the solution viscosity was higher than those in the cases using polyfunctional phenols. The solution viscosity of the 50% toluene solution measured by a cone-plate viscometer was 282 mPa·s, and the solution viscosity was higher than those in the cases using polyfunctional phenols.

INDUSTRIAL APPLICABILITY

The polyphenylene ether of the present invention is excellent in flowability and therefore applicable to various uses. Among others, the polyphenylene ether of the present invention is capable of forming a prepreg having less voids or the like and therefore useful as a material for parts of electrical and electronic devices and the like (specifically, materials having low dielectric characteristics for processing a large amount of data at a high speed in a highly advanced information society, and the like).

The invention claimed is:

1. A polyphenylene ether having a structure represented by formula (1a), formula (1b), formula (1c), or formula (1d) below:

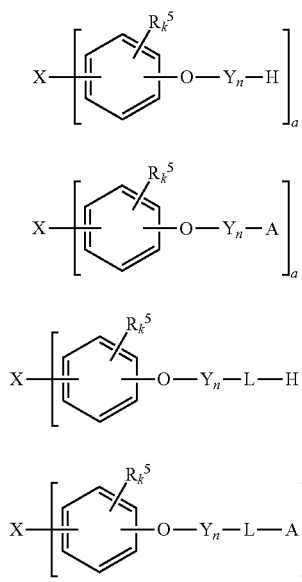

wherein
X is an arbitrary a-valent linking group; a is an integer of 3 to 6; each $R^5$ is independently an arbitrary substituent, each k is independently an integer of 1 to 4; each Y is independently a divalent linking group represented by formula (3) below; each n represents number of repetitions of Y and is independently an integer of 1 to 200; each L is independently an arbitrary divalent linking group; and each A independently represents a substituent containing a carbon-carbon double bond and/or an epoxy bond:

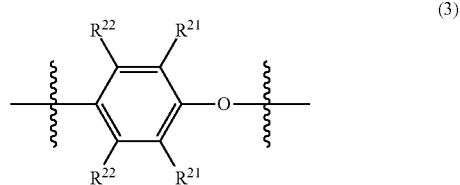

wherein
each $R^{21}$ is independently a saturated or unsaturated C1-6 hydrocarbon group, and
each $R^{22}$ is independently a hydrogen atom or a saturated or unsaturated C1-6 hydrocarbon group, and the saturated or unsaturated hydrocarbon group may have a substituent within a limit satisfying the requirement of C1-6,
and wherein a moiety of the structure of formula (1a), formula (1b), formula (1c), or formula (1d) that excludes the structure represented by -Yn-H, -Yn-A, -Yn-L-H, or -Yn-L-A, represented by the following formula (1')

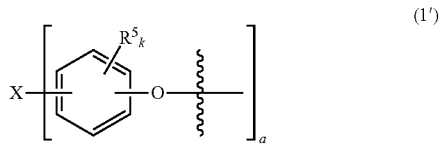

is selected from the group consisting of the following structures:

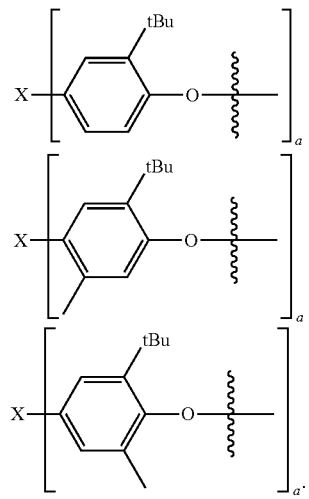

2. A manufacturing method of a polyphenylene ether, comprising:
reacting
an arbitrary polyphenylene ether with
an a-valent phenol having a structure represented by formula (9),

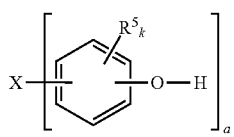 (9)

where a=3 to 6, X is an arbitrary a-valent linking group, $R^5$ is an arbitrary substituent, and k is an integer of 1 to 4, at least one of the number k of $R^5$ is a substituent group represented by formula (2) below to form an obtained polyphenylene ether, and then introducing a substituent containing a carbon-carbon double bond and/or an epoxy bond into a terminal of the obtained polyphenylene ether:

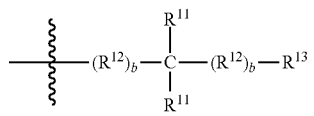 (2)

wherein
each $R^{11}$ is independently a C1-8 alkyl group; each $R^{12}$ is independently a C1-8 alkylene group; each b is independently 0 or 1; $R^{13}$ represents any one of a hydrogen atom, a C1-8 alkyl group, and a phenyl group; and the alkyl group, the alkylene group, and the phenyl group may have a substituent within a limit satisfying the requirement of C1-8.

3. The method according to claim 2, wherein the group represented by formula (2) is a t-Bu group.

4. The method according to claim 2, wherein the group represented by formula (2) is bonded to 2-position or 6-position of the benzene ring.

5. The polyphenylene ether according to claim 1, wherein $R^{21}$ in the group represented by formula (3) is a methyl group.

6. The polyphenylene ether according to claim 1, wherein a number-average molecular weight is 500 to 30000 in terms of polystyrene.

7. A polyphenylene ether composition comprising 0.5% to 95% by mass of the polyphenylene ether according to claim 1.

8. A prepreg comprising
the polyphenylene ether composition according to claim 7.

9. The method according to claim 2, wherein each of $R^{11}$ and $R^{13}$ in the group represented by formula (2) is a methyl group.

* * * * *